(12) United States Patent
Ewald et al.

(10) Patent No.: US 8,850,969 B2
(45) Date of Patent: Oct. 7, 2014

(54) DEVICE AND METHOD FOR MELTING CHEESE

(75) Inventors: Henry T. Ewald, Roselle, IL (US); Paul G. Simmons, Glen Ellyn, IL (US)

(73) Assignee: Restaurant Technology, Inc., Oak Brook, IL (US)

(*) Notice: Subject to any disclaimer, the term of this patent is extended or adjusted under 35 U.S.C. 154(b) by 0 days.

(21) Appl. No.: 13/452,182

(22) Filed: Apr. 20, 2012

(65) Prior Publication Data

US 2013/0280394 A1 Oct. 24, 2013

(51) Int. Cl.
*A23C 3/02* (2006.01)
*A47J 39/00* (2006.01)

(52) U.S. Cl.
CPC ............................... *A47J 39/00* (2013.01)
USPC ............................................. 99/483; 426/511

(58) Field of Classification Search
USPC ........... 99/473, 467, 483, 339, 386, 332, 349, 99/510; 426/511, 392, 468, 523, 506, 510
See application file for complete search history.

(56) References Cited

U.S. PATENT DOCUMENTS

| | | | |
|---|---|---|---|
| 2,358,526 A | 9/1944 | Mitchel | |
| 3,236,172 A | 2/1966 | Haedike | |
| 3,555,993 A | 1/1971 | Garcia | |
| 3,736,860 A | 6/1973 | Vischer, Jr. | |
| 3,794,016 A | 2/1974 | Binks | |
| 3,830,944 A | 8/1974 | Dimitriadis | |
| 4,179,985 A | 12/1979 | Baker | |
| 4,197,791 A | 4/1980 | Vieceli | |
| 4,617,908 A * | 10/1986 | Miller et al. | 126/20 |
| 5,240,730 A | 8/1993 | Jamet | |
| 6,153,244 A * | 11/2000 | Stanger et al. | 426/511 |
| 6,171,630 B1 | 1/2001 | Stanger | |
| 6,582,743 B2 | 6/2003 | Cai | |
| 7,049,551 B2 | 5/2006 | Williams | |
| 7,222,563 B2 | 5/2007 | Reckert et al. | |
| 7,810,488 B2 | 10/2010 | Manganiello et al. | |
| 2003/0188929 A2 | 10/2003 | Winfree | |
| 2004/0208961 A1 | 10/2004 | Reckert | |
| 2006/0134273 A1 | 6/2006 | Proper | |
| 2006/0243721 A1 | 11/2006 | Sorensen | |
| 2010/0098825 A1 | 4/2010 | Veltrop et al. | |
| 2010/0151092 A1 | 6/2010 | Sus et al. | |
| 2011/0162537 A1 * | 7/2011 | Chung et al. | 99/473 |
| 2011/0250336 A1 * | 10/2011 | Ewald et al. | 426/511 |

OTHER PUBLICATIONS

International Searching Authority, International Search Report and Written Opinion, International Application No. PCT/US2013/036710, Aug. 26, 2013.

* cited by examiner

*Primary Examiner* — Henry Yuen
*Assistant Examiner* — Phuong Nguyen
(74) *Attorney, Agent, or Firm* — Hinshaw & Culbertson LLP

(57) ABSTRACT

An device and method are provided for steam injection heating to melt a cheese component of a food item of a food product. The device includes a housing for a steam generator and a steaming chamber. Generated steam is injected into the steaming chamber to melt the cheese component of the food item held in a container inserted into the steaming chamber. The device is configured to rest on a counter so that the counter provides an interior support surface in the steaming chamber. The counter also provides an exterior support surface for the container and a work surface. The container is inserted into the steaming chamber by sliding it on the exterior surface and is received and supported by the interior support surface. A food product having a melted cheese component is assembled, produced and packaged while the container is supported in the single plane of the counter.

25 Claims, 11 Drawing Sheets

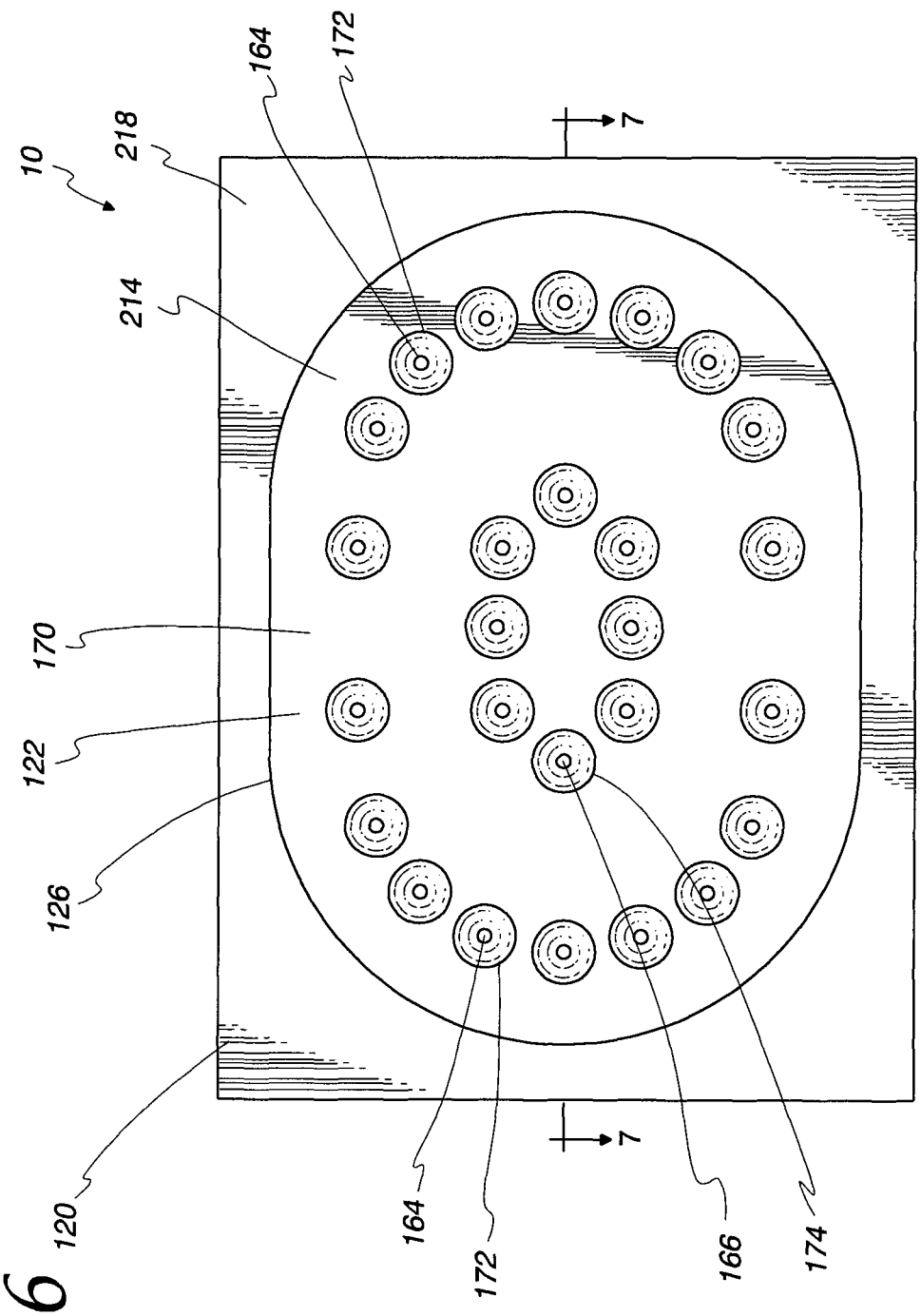

DEVICE AND METHOD FOR MELTING CHEESE

FIELD OF THE INVENTION

The invention relates to a device and method for melting cheese. In one configuration, the invention generally relates to a device and method for high speed melting of a cheese component of a food product, such as for example, melting a slice of cheese, which may be a slice of a hard cheese, that is to be included in a sandwich. The apparatus and method are particularly useful in assembling, producing and packaging food items having a consistent and uniform melted cheese component in quantities typically used in filling orders in a Quick Service Restaurant (QSR).

BACKGROUND OF THE INVENTION

A need exists for a device and method that can provide increased efficiencies in assembling food items that initially include an unmelted cheese component (typically a slice of cheese, including a hard cheese), and melting a cheese component in the device when present as part of a sandwich so that after final assembly of the food item the cheese component is melted to a desired degree and/or in accordance with the method.

A need exists for a device and method that can be used in existing kitchen layouts to increase the production efficiency for melting a cheese component that is included in a food product.

A need exists for a device and method for uniformly and consistently melting a cheese component (typically a slice of cheese, including a hard cheese) of a food item that can provide increased efficiency for combining food items to produce a food product, wherein at least one of the food items includes a melted cheese component that has been melted by the device and/or in accordance with the method.

A need exists for a device and method for rapidly and on demand melting a cheese component of a sandwich that can provide increased efficiency for the melting of the cheese component, the final assembly of the sandwich and the packaging of the completed food product including a cheese component that has been melted to a desired degree by the device and/or in accordance with the method.

A need exists for a method for efficiently melting a cheese component included in food product.

A need exists for a method for efficiently assembling, producing and packaging of a food product that includes a melted cheese component.

A need exists for a method for efficiently assembling, producing and packaging a finished, stacked food product ready to be served to a customer at a restaurant that includes layered or stacked food items wherein at least one layered or stacked food item includes a melted cheese component.

SUMMARY OF THE INVENTION

A device for melting cheese is provided in accordance with the invention. The cheese melting device in one embodiment comprises a housing configured to rest directly on a counter surface. The device is suitable for melting an exposed cheese component of a food item. Typically, the cheese component will be what is commonly known as a "hard" slice of cheese (as opposed to a pasteurized process type of cheese food, although that type of cheese food could also be utilized in accordance with the devices and methods of the present invention). Typically, it is contemplated that in use the exposed cheese component would be placed on a bun or other food product with the cheese face up on the bun or other food product. The cheese and other food item would be placed in a container for supporting the cheese and other food item. The container could be a clamshell container or a sheet of food wrapping material (paper or foil, for example). The combination of the cheese and other food product resting on the container is inserted into the cheese melting device and after melting is withdrawn from the cheese melting device. The same container is then used to enclose the finished food product for service to a customer as a closed or enclosed package.

The housing of the device for melting cheese is configured to rest directly on a counter surface in one embodiment. A cheese melting chamber forms part of the cheese melting device and is located within the housing. The cheese melting chamber has an interior, a top wall, sidewalls and an entrance opening for allowing the container to be readily inserted with the food item and the cheese component located in the container and then withdrawing from the cheese melting chamber by sliding the container along the counter surface. The counter surface provides an interior support for the container when placed in the cheese melting chamber allowing the container to be readily moved into and out of the cheese melting chamber without lifting it from the counter surface.

The cheese melting device in accordance with the invention further includes a steam generator for generating steam from liquid water supplied to the steam generator which in turn supplies heat to the cheese melting chamber to melt the cheese placed therein by passage of the steam through at least one steam passageway that provides fluid communication between the steam generator and the cheese melting chamber allowing steam generated by the steam generator to be directed into the cheese melting chamber.

The cheese melting device in accordance with the invention typically includes a control system for initiating operation of the cheese melting device including causing steam to be generated on demand and rapidly by the steam generator by converting water supplied by the steam generator into steam. The generated steam is directed through the one or more steam passageways and into the steaming chamber to melt the cheese component contained in the container.

Typically, the device includes a plurality of steam passageways from the steam generator to a steam exit opening in communication with the cheese melting chamber that are positioned adjacent the top wall of the cheese melting chamber. This ensures rapid and uniform distribution of the steam to evenly heat the cheese component placed therein. Typically, the steam passageways pass through the top wall of the cheese melting chamber and the steam exit openings are positioned on a bottom surface of the top wall of the cheese melting chamber so that steam is injected downwardly from the exit openings and into the cheese melting chamber.

In accordance with another aspect of the invention, the steam generator is a flash steamer. In operation, the controller causes liquid water to be injected into the flash steamer and the flash steamer rapidly converts the liquid water into steam for subsequent injection into the cheese melting chamber. Advantageously, the flash steamer is configured to have a bottom and the bottom of the flash steamer can be the top of the cheese melting chamber. Alternatively, the flash steamer can be spaced from the top wall of the cheese melting chamber.

Structure may be provided to stop or restrict further insertion of a container into the cheese melting chamber so that the container is placed in the optimum position for allowing impingement of steam onto the cheese component when placed therein. Thus, when a clamshell type container is used, only one half of an open clamshell container is inserted into the cheese melting chamber to allow steam injection heating of the cheese component contained therein while the second portion of the clamshell or open top of the clamshell is substantially spaced outside the cheese melting chamber to avoid steam injection heating of any food product contained in the second compartment of the clamshell container.

The steam generator can be configured to produce pulses of steam which pulses travel through one or more suitable passageways that communicate with the cheese melting chamber. Typically, the passageways are arrayed so that steam is injected downwardly into the cheese melting chamber to cause the steam to impinge directly on the cheese component to be melted that is positioned in the cheese melting chamber. In one embodiment, the steam generator is configured to produce sufficient steam that is directed into the cheese melting chamber via the steam passageway that is sufficient to melt a hard slice of cheese in about 10 seconds or less.

In another aspect of the invention, the steam exit openings are positioned within the cheese melting chamber to direct injected steam towards two spaced apart target areas to allow simultaneous steaming of two different slices of cheese.

In accordance with another aspect of the invention, a method of assembling, producing and packaging a food product that includes a melted cheese component is provided. The method includes providing a cheese melting device having a steaming chamber with an entrance opening and providing a counter work surface. The cheese melting device is positioned on the counter work surface so that the work surface provides a floor for the steaming chamber. A food product container is provided that may be a clamshell container or some other type of container or even a sheet of food wrapping material. The container is capable of forming a closed package for the food item after the cheese component is melted in accordance with the invention. The container is large enough to permit a first food item having the unmelted cheese component thereon together with a second food item that is not to be heated by the cheese melting device. For example, in a hamburger sandwich, it is contemplated that the bun crown face up with a slice of cheese thereon or a slice of bread with the slice of cheese thereon would be placed in the steaming chamber and the remainder of the sandwich would be located on or in the container but located outside of the steaming chamber during operation so as to melt the cheese component. The bottom of the open clamshell or sheet of food wrapping material is supported on the work surface adjacent to the steaming chamber entrance allowing the container to be placed in front of the steaming chamber and that portion of the container containing the cheese component to be melted can be slideably inserted with the container into the steaming chamber without lifting it from the counter while maintaining the second food item outside of the steaming chamber. Thereafter, steam is injected in sufficient quantity to the steaming chamber to impinge on and melt the cheese component located in the portion of the container that has been inserted into the steaming chamber. Thereafter, the container is withdrawn from the steaming chamber while continuing to support the bottom of the container on the counter. Thus, the container does not have to be lifted which helps prevent disturbing the food products contained thereon. Thereafter, the container can be closed to provide a closed package for delivery of the enclosed food item having the melted cheese component therein to a consumer. In the case of a clamshell container, the clamshell container is closed to provide the package configuration and in the case of a container that is composed of a food wrapping material, the food wrapping material is wrapped around the food products containing the melted cheese component to provide the closed package.

In accordance with another aspect of the method, the food product can be finally assembled while the container is supported on the work surface outside of the steaming chamber. This simplifies the amount of work that is to be done by the person assembling the food product.

In accordance with another aspect of the invention, a device for melting a cheese component of a food product is provided.

Other advantages and features of the invention will become apparent from the following description and from reference to the drawings.

BRIEF DESCRIPTION OF THE DRAWINGS

FIG. 6 is a bottom view of the bottom wall and the bottom plate of the steaming device that forms the top wall of the steaming chamber of the device of FIG. 1;

DETAILED DESCRIPTION

Figure 1:
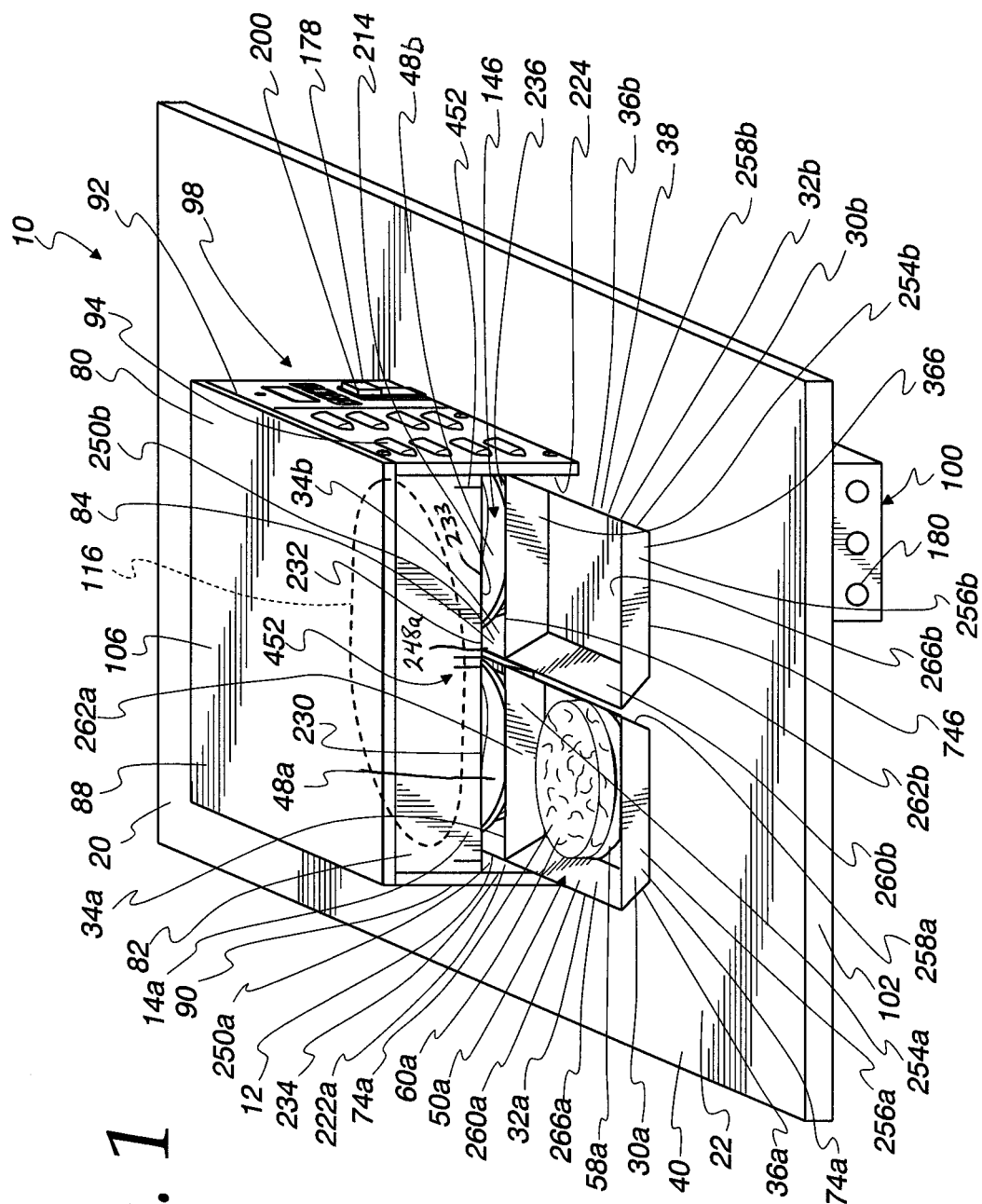
FIG. 1 is a front perspective view of a device in accordance with the present invention.

While this invention is susceptible of embodiment in many different forms, there are shown in the drawings and described in detail herein, several specific embodiments with the understanding that the present disclosure is to be considered as exemplifications of the principles of the invention and is not intended to limit the invention to the illustrated embodiments.

Referring to FIGS. 1-7, there is illustrated a cheese melting device 10 of the present invention. Device 10 includes a heating or steaming chamber 12 in which a cheese component 14 of a food product 18 is melted by steam injection heating.

Device 10 is configured to obtain superior operational efficiencies and benefits for assembling, producing and packaging food product 18 having a melted cheese component 14. Thus, cheese melting device 10 is advantageous for use in a Quick Service Restaurant operation wherein high efficiency and uniform production and packaging of food products 18 is a necessity. High efficiencies and uniform product quality are especially critical for meeting the production requirements occurring during peak ordering periods, such as those experienced at the lunch and dinner hours.

Device 10 is configured so that it may rest on a support surface 20 that typically will be a counter or work surface 22 of a kitchen area in a commercial restaurant operation. The interior 24 of steaming chamber 12 optionally has an interior support surface 28 for a transport and packaging member 30 that contains the cheese component 14 to be melted by device 10. Alternatively, the countertop may be used as the support, transport and packaging member 30. Exemplary transport and packaging member 30 is a container such as a clamshell container 32 that, when in the open position shown for example in FIGS. 1-3, has a first open compartment 34 and a second open compartment 36. When clamshell container 32 has been inserted into steaming chamber 12 with compartment 34 as the lead compartment, compartment 34 is supported on interior support surface 28 in steaming chamber 12. At the same time, trailing second compartment 36 can be supported on an exterior support surface 38, such as work surface 22. Exemplary device 10 is configured so that interior support surface 28 and exterior support surface 38 are in the same, or substantially the same, plane. Preferably, interior support surface 28 and exterior support surface 38 are both provided by the top surface 40 of work surface 22.

Alternatively, the container or transport member could be in one compartment half of a clamshell container or a small sheet of cardboard or a sandwich wrapper, for example, such as a single use component served with the sandwich.

As discussed below, this novel and inventive configuration for cheese melting device 10 provides superior operational efficiencies and benefits for the rapid assembly, production and packaging of food product 18 having a melted cheese component 14. Moreover, cheese melting device 10 can be used at almost any existing counters or work surfaces 22 typically found in a kitchen area of a Quick Service Restaurant. Thus, with no modifications for the kitchen area, cheese melting device 10 may be used to greatly increase the efficiency for producing and packaging a food product 18 having a melted cheese component 14.

Figure 5A:
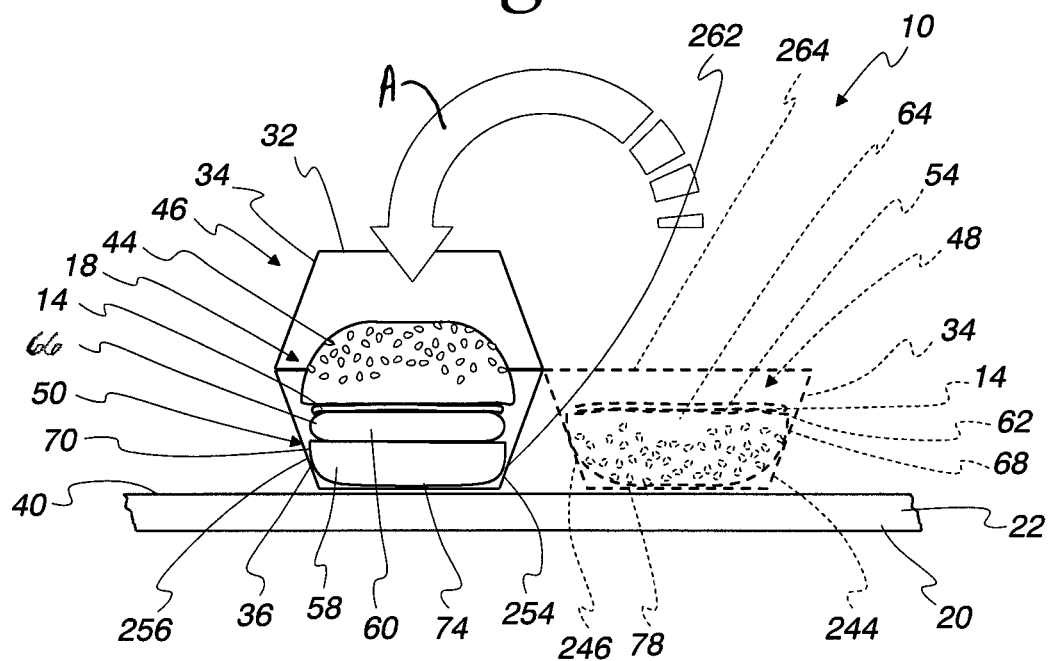
FIG. 5a is side elevation view of a transport and packaging member that can be used with the device of FIG. 1 and in accordance with the method of the invention, the transport and packaging member containing food items and being illustrated as movable from an open position to a closed position.
Figure 5B:
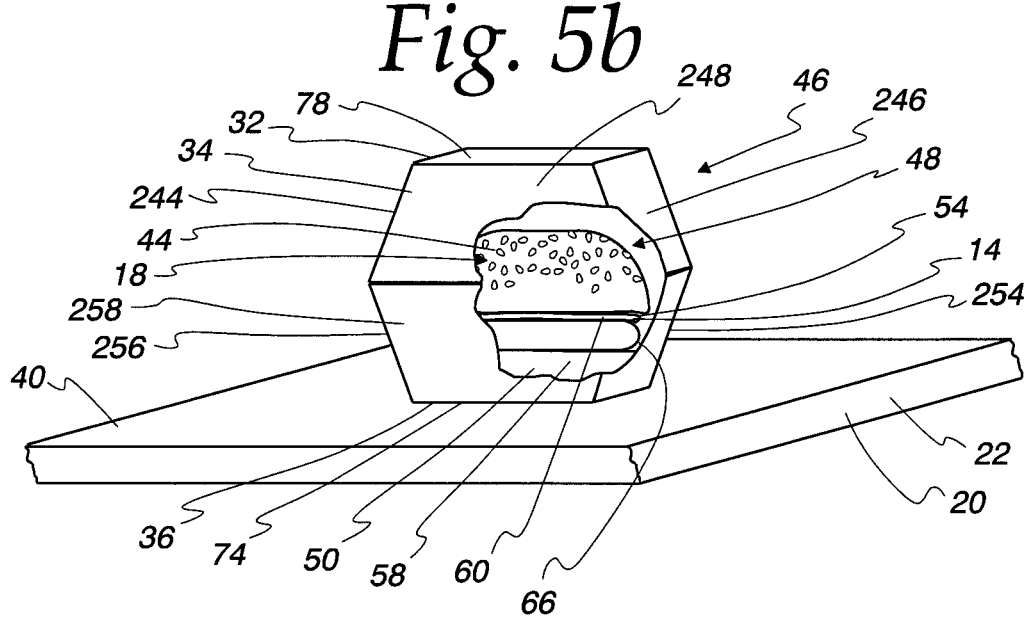
FIG. 5b is a partially cut away side perspective view of the transport and packaging member of FIG. 5a that has been moved to the closed position to provide a closed package for a food product produced with the device shown in FIG. 1. and in accordance with the method of the invention.

The general operation of device 10 can be appreciated by the production of exemplary food product 18 that is shown as a sandwich 44 which includes melted cheese component 14. Exemplary sandwich 44 typically is formed from two previously assembled and vertically stacked food items 48 and 50. Food items 48, 50 are later stacked one upon the other to form sandwich 44, as best seen in FIGS. 5a and 5b. This is done after the cheese component 14 of stacked food item 48 has been melted by steam injection heating by device 10. For example, exemplary stacked food item 48, which eventually forms the upper portion of sandwich 44, may be a bun crown 52 with a cheese slice 54 that is to be melted with device 10. In order to achieve increased efficiency of sandwich production output, device 10 can be used to rapidly melt non-pasteurized cheese components 14 which are typically more difficult to quickly melt than pasteurized process cheeses. For example device 10 can rapidly melt a cold, hard non-pasteurized cheese slice 54. For example, cold, hard (non-pasteurized process) cheese slice 54 for a typical sandwich 44 can be melted by device 10 in 10 seconds or less. More specifically a cold, hard non-pasteurized cheese slice 54 can be melted with a steam heating cycle in steaming chamber 12 in about 8 seconds. Non-limiting examples of such hard cheeses include, for example, cheddar, Colby, Swiss, and Emmental cheese.

Exemplary food item 50, which eventually forms the lower portion of sandwich 44, may comprise a bun heel 58 upon which is placed a meat component 60. Examples of meat components 60 include meat products such as beef, hamburger patties, chicken, chicken breast, or other meat products. In additionally or alternatively, food item 50 may include egg or other egg product food components. Stacked food item 50 may also include condiments, dressings, lettuce, sliced tomato, pickles or other food components (not shown) that are stacked above and/or below meat component 60. For other food products 18, stacked food item 48 also may include condiments, dressings, lettuce, sliced tomato, pickles or other food components that are stacked in compartment 34.

Stacked food items 48, 50 are assembled in transport and packaging member 30. For achieving efficient sandwich production output, assembling of stacked food items can be done with an opened transport and packaging member 30 positioned on counter 22 proximate to steaming chamber 12 of device 10. Transport and packaging member 30 is then further used to transport stacked food item 48 into position within steaming chamber 12 of device 10 for the purpose of melting cheese slice 54. Advantageously, transport and packaging member 30 also provides the packaging of finished sandwich 44 in which it is delivered to a customer. Thus, it can be appreciated that the novel configuration of device 10 provides for efficient production of sandwich 44 by minimizing movement of stacked food items 48, 50 and the container 32 during the production and packaging process of sandwich 44.

Clamshell container 32 may be formed of cardboard, expanded foam or any other suitable material that can withstand the effects of injection steam heating and thereafter provide suitable packaging for delivery of the finished food product 18 to a consumer. Exemplary container 32 is shown as a clamshell container 32 that has a generally rectangular shape when in the open position and with generally square shaped compartments 34, 36 when viewed from the top. Other suitable types of containers 32 and other suitable shapes for clamshell container 32 may also be used with device 10 for the production of food products 18 having a melted cheese component 14. For example clamshell container 32 may have compartments 34, 36 having generally circular, oval or other regular or irregular shapes for holding food items 48, 50 and for packaging finished food product 18.

When container 32 is in the open position, both compartments 34 and 36 have open tops. With open container 32 supported on a work surface 22 of device 10, stacked food items 48, 50 may be conveniently and quickly assembled in compartments 34, 36, respectively. Thereafter, open top compartment 34 is slid along work surface 22 and into position in steaming chamber 12 of device 10. Cheese slice 54 of exemplary vertically stacked food item 48 is then rapidly melted by steam injection heating in steaming chamber 12. At the same time, vertically stacked food item 50 in compartment 36 of container 32 may be substantially isolated from the steam injection heating process. After steam injection heating to melt cheese slice 54, container 32 is withdrawn from steaming chamber 12 by sliding container 32 along work surface 22. In FIG. 1 it is noted that compartment 36b of container 32b is shown without a food item therein for illustrative purposes. Typically, a food item that is like food item 50a would be placed in compartment 36b. However, it is further noted that food item 48 and its cheese component 14 might be steam injection heated without a food item 50 in compartment 36.

Importantly, during the assembly of stacked food items 48 and 50, and also during the process of inserting and withdrawing container 32 into and out of steaming chamber 12, container 32 remains supported on the same substantially horizontal plane of work surface 22. This allows the melting of cheese slice 54 to be accomplished with minimal movement of container 32 and its stacked food components 48, 50. More specifically, no vertical movement of container 32 is required during the assembly of stacked food items 48, 50, or during the melting of cheese slice 54. Additionally, since work surface 22 is located adjacent to steaming chamber 12, minimal horizontal movement of container 32 is required during the production and packaging of sandwich 44. Limiting horizontal and vertical movement is important because it avoids, or at least greatly minimizes, the chance of disturbing the carefully vertical stacked arrangement of food items 48, 50 that have been assembled in compartments 36, 38, respectively. Also, by eliminating vertical movement, there no chance that a container 32 holding assembled food item 48 and/or food item 50 could be dropped while transporting container 32 to device 10. Moreover, container 32 will not be tilted out of a horizontal plane and thereby disrupt stacked food items 48 and/or 50 during their transport in container 32 to device 10. Nor would container 32 be harshly placed onto work surface 22 so as to jar stacked food items 48, 50 from their careful arrangement. Once stacked food items 48, 50 have been stacked, they can remain in the desired stacked orientation while conducting steam injection heating to melt cheese component 14. Moreover, once unmelted cheese slice 54 has been at least relatively centrally positioned on bun crown 52, it can remain at least relatively centrally located while container 32 is horizontally slid along the substantially horizontal plane of work surface 22 and into steaming chamber 12 for melting cheese slice 54.

By eliminating, or at least very substantially reducing, the chance of a positional shifting of cheese slice 54 prior to its melting, after the cheese slice 54 is melted, the melted cheese slice 54 will be located in its desired position on food item 48. Additionally, when the finished sandwich 44 is formed, the position of melted cheese slice 54 in the finished sandwich will also be the desired position. As discussed later in detail, in the production of some types of sandwiches, it may be desired that unmelted cheese slice 54 slightly overlaps the periphery 62 of the inner side 64 of inverted bun crown 52. This is done so that when cheese slice 54 is melted by steam injection heating, the melted cheese slice 54, conforms to, or flows onto, at least a portion of the sidewall 68 of bun crown 52. In this manner, the melted cheese slice 54 is more securely adhered to bun crown 52. Thus melted cheese slice 54 remains adhered to bun crown 52 when bun crown 52 is turned right side up to form sandwich 44. Also, it is desirable for some types of sandwiches to provide finished sandwich 44 with a melted cheese slice 54 that extends along at least a portion of outer sidewall 68 around substantially the entire periphery 62 of bun crown 52. This allows melted cheese slice 54 to be visible to the consumer when viewing the finished sandwich 44 so as to provide a more attractive and appetizing appearance. For the same reason, when producing other types of food products (not shown) wherein cheese component 14 is placed on a bun heel 58 for melting, it may be desirable to have melted cheese component 14 likewise extend and to adhere to the outer sidewall 70 of bun heel 58.

In the production of other types of sandwiches, cheese component 14 may be placed on a top surface 72 of meat component 60 for melting by device 10. In such instances, it may be similarly desired that melted cheese component 14 be fully distributed to extend along the entire top surface 72 of meat component 60, and/or to also further extend at least along a portion the sidewalls 66 of meat component 60, or other adjacent food component or food components. In all of the above noted examples, device 10 prevents shifting of unmelted cheese component 14 from its relatively precise position on food item 48 or food item 50 when transporting in container 32 into steaming chamber 12 for steam injection heating. Since cheese component 14 is not shifted by vertical or substantial horizontal movement of container 32, cheese slice 54 remains in the proper position until steam injection heating is initiated. This results in the melted cheese component 14 being located in the desired position on finished sandwich 44, or other type of finished food product 18, to provide an attractive and appetizing food product 18.

Importantly, the movement of container 32 is also limited when conducting the steps of sandwich production which take place after the completion of the steam injection heating to melt cheese component 14. These post melting steps include: 1) withdrawing container 32 from steaming chamber 12; 2) transferring one of food items 48, 50 when placing it over the other food item 48, 50 to form sandwich 44; and 3) closing container 32 to form a closed package 46 in which sandwich 44 is delivered to a consumer. With regard to the container withdrawing step, it is noted that container 32 remains supported in the same substantially horizontal plane of top surface 40 of work surface 22 in which the food item assembly and the steam injection heating took place. With regard to the sandwich formation step, it is noted that container 32, and one of food items 48, 50, also continues to be supported in the same horizontal plane during the step of sandwich formation in which one of food items 48, 50 is placed on the other. With regard to the container closing step, it is noted that at least one of compartments 36, 38 continues to remain supported in the same plane on work surface 22 during the closing of container 32. For example, this can be accomplished since bottom 74 of compartment 36 can continue to remain supported on work surface 22 as the bottom 78 of compartment 34 of clamshell container 32 is folded over compartment 36 to close clamshell container 32 and provide closed package 46.

It is also noted that the bottom portion of sandwich 44, i.e. food item 50, for exemplary sandwich 44, is in fact continually supported in the same plane during the entire period of time of the production and packaging procedures. More specifically, bottom 74 of compartment 36 remains on work surface 22 during the assembly of food item 50, during the steam injection heating of cheese component 14 of food item 48, during the formation of sandwich 44 when placing food item 48 on top of food item 50, and during the closing of container 32 to form package 46 by folding compartment 34 over compartment 36 holding food item 50. Thus, a stacked food item 50, comprising a vertical stack of bun heel 58, meat component 60 and any sauces, condiments and other food components that may be also included to form stacked food item 50, can remain undisturbed in a carefully stacked arrangement during the entire process for producing sandwich 44. It is further noted that, after formation of stacked sandwich 44, stacked food item 50 and remainder of sandwich 44 can continue to avoid vertical movement during the closing of container 32 to form closed package 46. This can be accomplished since bottom 74 of compartment 36 can continue to remain on work surface 22 as the bottom 78 of compartment 34 of clamshell container 32 is folded over compartment 36 to close clamshell container 32.

Moreover, it is further noted while stacked food item 48 does not remain supported in the same horizontal plane for all of the sandwich production process, stacked food item 48 does remain in the same plane during almost all of the sandwich production cycle. More specifically, bottom 78 remains supported in the same horizontal plane of work surface 22 during: 1) assembly of food item 48; 2) insertion and withdrawal of compartment 48 into and out of steaming chamber 12; and 3) transfer of food item 48 from compartment 34 to compartment 36. It is further noted at this time, that container 32 may be secured in the closed position of closed package 46, such as for example, by inserting and interlocking tabs and slots (not shown) provided on container 32. In this manner, a closed package 46, seen best in FIG. 5b, provides securely closed package 46 from transport and packaging member 30 or container 32, in which stacked food product 18 can be delivered to a customer.

It is to be understood that the foregoing example describes the production and packaging of exemplary food product 18. In the production of other types of food products, alternate procedures for practicing the present invention may also be used. For example, it may be advantageous to form a particular type of food product 18 by transferring a type of food item 50 from compartment 36 into compartment 34, as opposed to the previously described reverse order. In that case, stacked food item 48 remains undisturbed by vertical movement of bottom 78 of compartment 34 as it remains supported on work surface 22 while transferring food item 50 over food item 48. Thereafter, container 32 may be closed by moving compartment 36 over compartment 34 while bottom 78 of compartment 34 remains supported on work surface 22. It is also noted that it may not always be necessary invert a food item 48 or 50 as it is transferred from one of compartments 36, 38 to the other of compartments 36, 38.

From the above discussion it can be appreciated that configuring device 10 to rest on a work surface 22 adjacent to entrance opening 84, and by having exterior support surface 38 and interior support surface 28 located in the same plane, superior operational efficiencies and benefits can be achieved. Food items 48, 50 can be assembled in container 32 while it is positioned near the entrance 84. This avoids confusion that may result in assembling food items at separate and/or remote locations. In that case food items 48, 50 may inadvertently be improperly matched for the specific order of a particular type of sandwich 44, or other food product 18. Food items 48, 50, can be assembled in a container prepositioned that is in a relatively aligned and orientated position proximate to entrance opening 84. Immediately after assembly of food items 48, 50, container 32 can be advanced forward a short distance to insert compartment 34 into steaming chamber 12. After steaming, compartment 36 which extends outwardly from steaming chamber 12 can be manually grasped by the operator to slide container 32 a short distance back on the work surface 22 and fully outside of steaming chamber 12. At this location adjacent or proximate to entrance opening 84, food item 48 can be transferred to a position on food item 50. Container 32 can then be closed to form closed package 46 and secured in the closed position. In addition to the relatively small required horizontal distances that container 32 travels during production and packaging of finished food product 18, also important is the lack of vertical movements of container 32 from a single plane during production and packaging. Avoiding vertical movements also avoids disruption of the carefully stacked arrangement of food items 48, 50. Thus, there is no need for an operator to pause at various times during the production and packaging process to readjust food items 48, 50 back to a previous carefully stacked arrangement. This significantly speeds up the production and packaging of food items 48, 50 and food products 18. Also, waste that might occur when dropping container 32 or tilting container 32 to spill food items 48, 50 during vertical movement of container 32 is eliminated.

Having provided a general description of the operation of device 10 along with a description of the numerous advantages of the present invention, device 10 and its operation to produce steam for steam heating is now described in greater detail. Device 10 includes a housing 80 with a front side 82. Front side 82 includes an entrance opening 84 for providing an access for container 32 to be inserted into steaming chamber 12. Housing 80 also includes a lid 88 and sidewalls 90, 92 which optionally include vent openings 94. Device 10 also includes an input panel 98 that may be located on housing 80, for example at housing sidewall 92. Device 10 preferably also includes an optional remote input 100. Remote input 100 preferably is mounted proximate to the front side 102 of work surface 22. Alternatively, remote input 100 may be placed at any other location that provides ready access for an operator of device 10. An operator of device 10 will typically stand at front side 102 of work surface 22 opposite from entrance opening 84 of steaming chamber 12. The back side 106 of housing 80 typically provides a suitable location where a water inlet fitting 108 can be mounted. Water inlet fitting 108 is connected to an external water line 110. Also, typically mounted to back side 106, are a power line cord 104 and an optional pressure blow off line connector 112. Also optionally provided is a pressure blow off conduit (not shown) that is connected through connector 112 and leads to a remote location where, if necessary, excessive pressure built up in device 10 can be exhausted.

Figure 2:
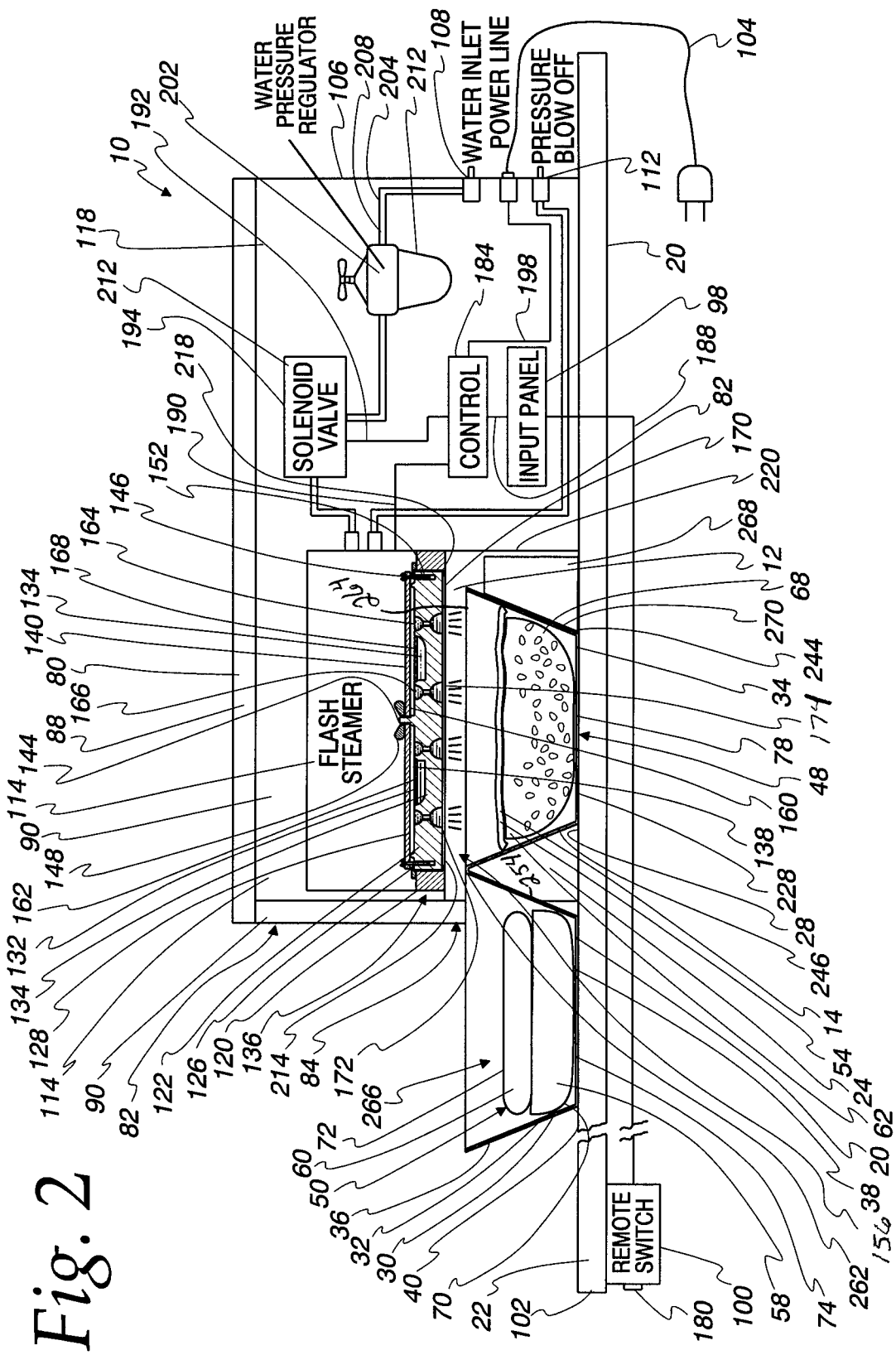
FIG. 2 is a side elevation view of the device of FIG. 1.
Figure 3:
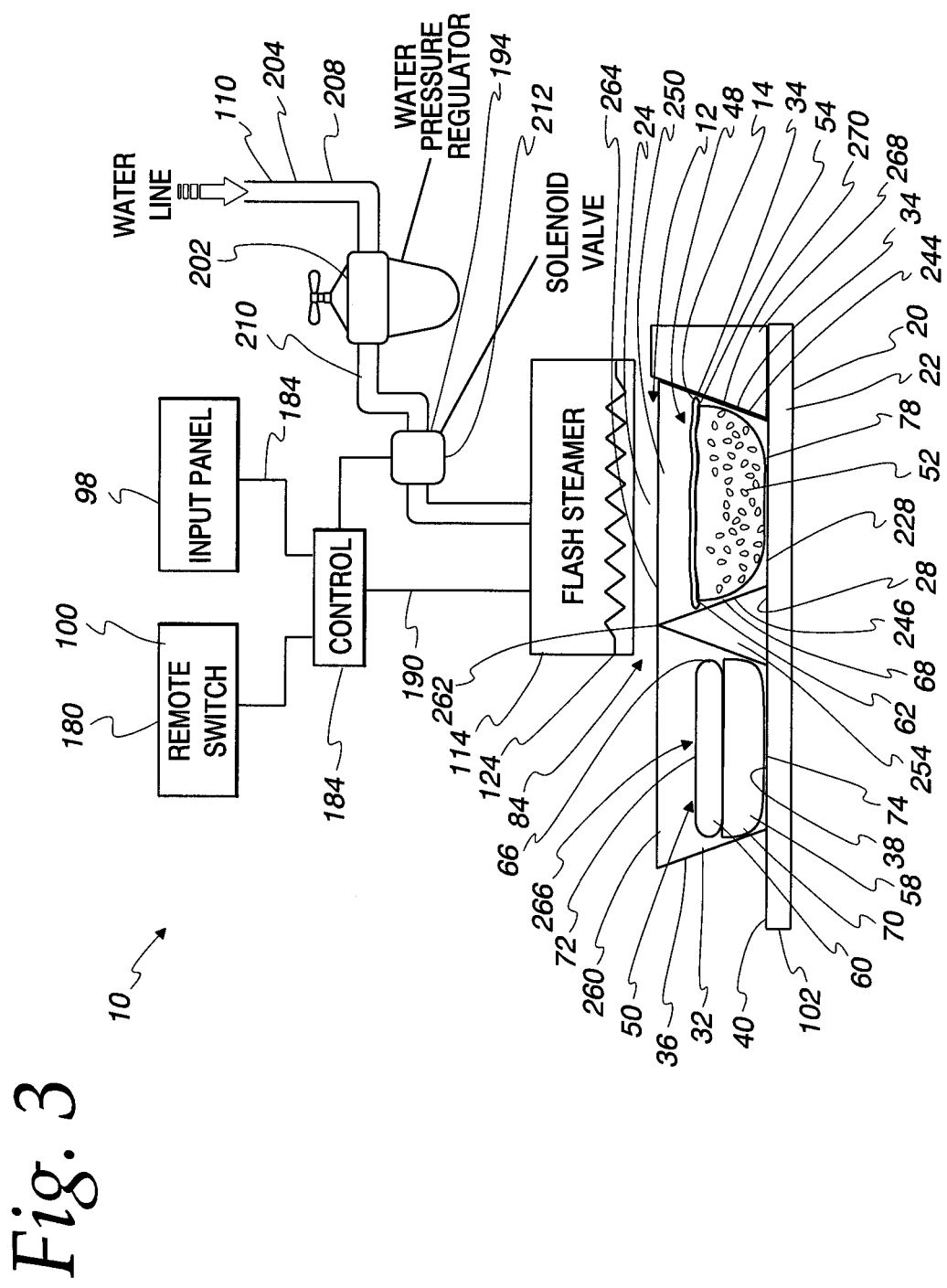
FIG. 3 is a schematic view of the device of FIG. 1.
Figure 4:
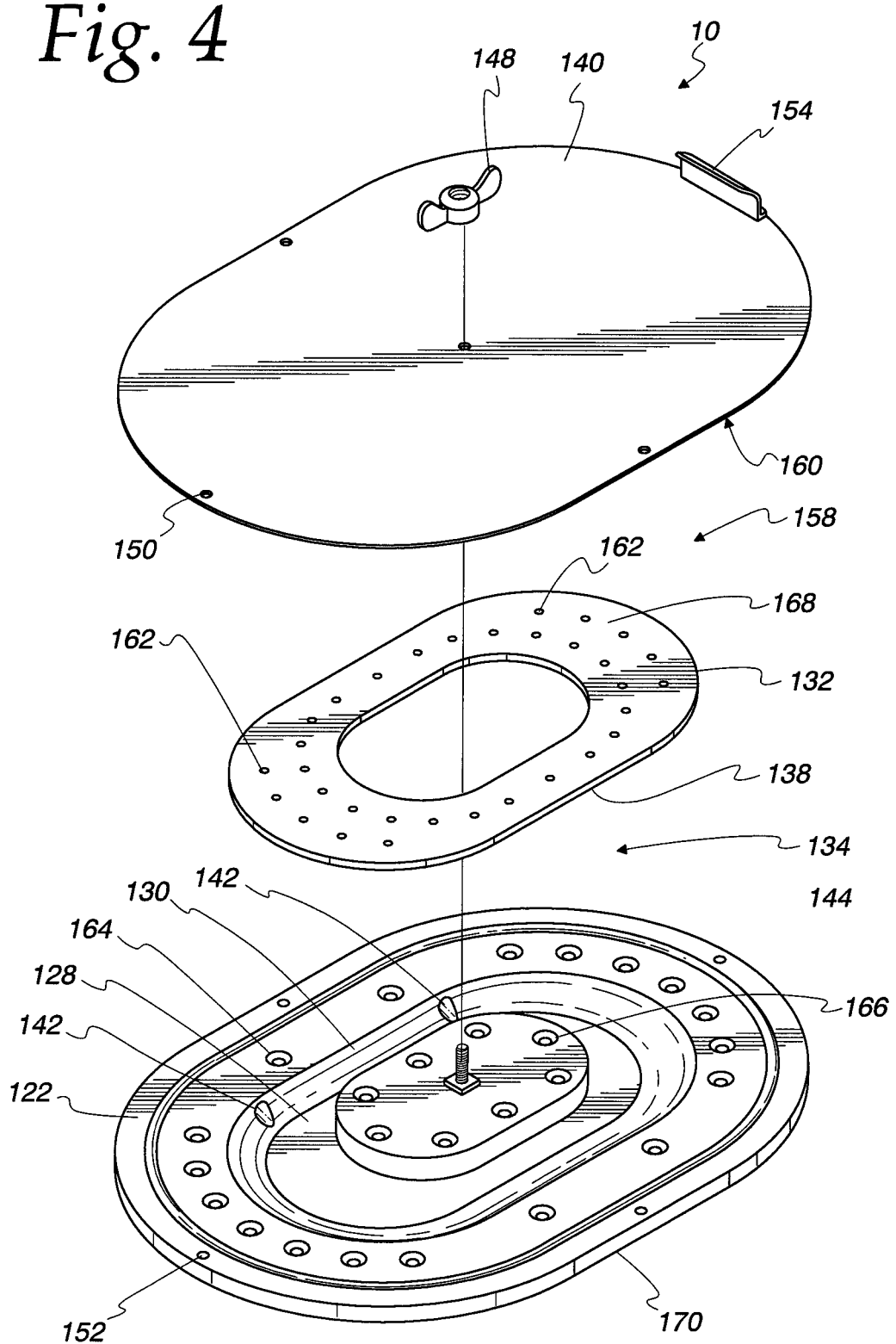
FIG. 4 is a top perspective exploded view of an assembly for the steam generator for the device of FIG. 1
Figure 7:
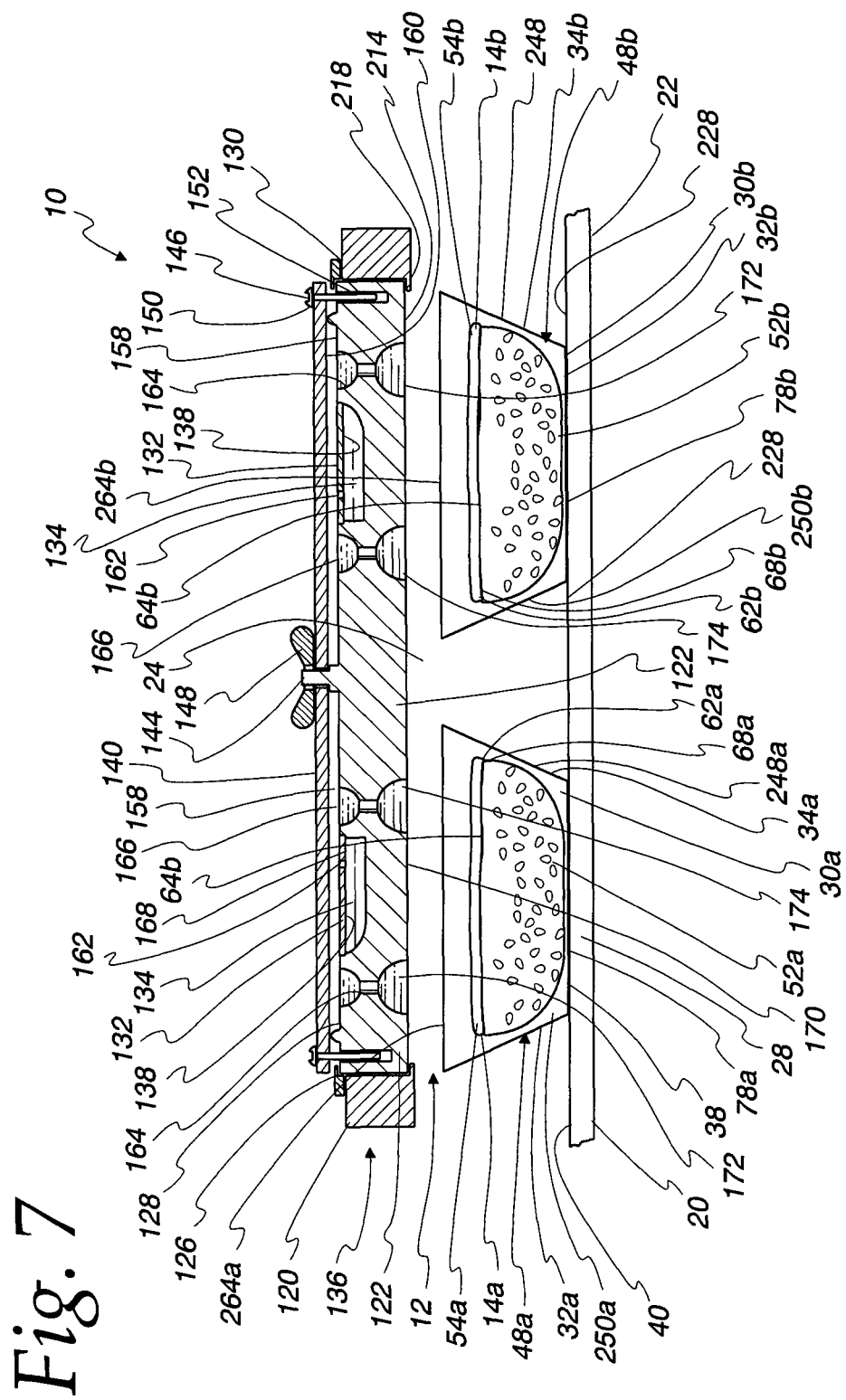
FIG. 7 is a side cross sectional view taken along line 7-7 of FIG. 6 and further showing two transport and packaging members in position for steaming the cheese component in the steaming chamber of the device of FIG. 1 and in accordance with the method of the invention.

Referring to FIGS. 1-4, 6 and 7, device 10 further includes a steam generator 114, which preferably is a flash steamer for rapidly generating steam from water injected into flash steamer 114. Flash steamer 114 is positioned in the interior 118 of steam unit housing 80, preferably above and proximate to steaming chamber 12. As best seen in FIGS. 4 and 7, flash steamer 114 includes a bottom wall 120 that includes bottom plate 122 that is inset within an opening 126 of bottom wall 120. Dashed outline 116 of FIG. 1 indicates the general location and orientation of bottom plate 122 relative to housing 80 and steaming chamber 12 of device 10. Bottom plate 122 is heated, such as by an electrical heating element 124 (shown in FIG. 3) that is typically located adjacent to heated bottom plate 122. A top surface 128 of bottom plate 122 includes centrally located oval shaped annular recess 130. A diffuser 132 is nested within recess 130. When so positioned, a heated cavity 134 is formed. Heated cavity 134, that provides a steam generating chamber, is located between top surface 128 of bottom plate 122 and the bottom surface 138 of diffuser 132. One or more water inlet openings 142 (shown only in FIG. 4) provide an entrance opening for injecting water into heated cavity 134. The liquid water injected into cavity 134 is turned into steam as it contacts the heated top surface 128 of heated bottom plate 122 and the heated bottom surface 138 of diffuser 132. Bottom surface 138 of diffuser 132 becomes hot due to its contact with, and proximity to, heated bottom plate 122.

A pressure plate 140 is positioned to overlay bottom plate 122 and diffuser 132. Pressure plate 140 is fastened in place by upstanding bolt 144 and a suitable fastener, such as wing nut 148. Additional fasteners (not shown) secure pressure plate 140 through apertures 150 in pressure plate 140 that are secured in threaded holes 152 in bottom plate 122. A handle 154 is provided for convenient removal of pressure plate 140 for servicing flash steamer 114. When pressure plate 140 is secured, a steam diffusing chamber 158 is formed. Steam diffusing chamber 158 is defined by the bottom surface 160 of pressure plate 140, the upper surface 168 of diffuser 132 and the top surface 128 of heated bottom plate 122.

When liquid water is injected through water inlet openings 142 and into heated cavity 134, steam is rapidly generated in heated cavity 134. The generated steam escapes upwardly from heated cavity 134 through passageways 162 in diffuser 132 and enters steam diffusing chamber 158. After entering steam diffusing chamber 158, the steam exits downward through outer passageways 164 and inner passageways 166 in bottom plate 122. At the bottom surface 170 of bottom plate 122, the steam exits downwardly from steam exit openings 172 and 174 of steam passageways 164 and 166, respectively. The steam exiting at exit openings 172 and 174 enters steaming chamber 12 to provided steam heating to melt cheese component 14. For the exemplary sandwich 44, cheese component 14 is cheese slice 54 of stacked food item 48 held in compartment 34 that has been positioned in steaming chamber 12. In this manner, for one aspect of the present invention, injected steam is relatively widely and evenly dispersed throughout steaming chamber 12 as the steam is injected into steaming chamber 12 through steam passageways 164 and 166.

Optionally, a particular type of steam injection cycle may selected by an operator through use of input panel 98. Input panel 98 may offer a selection among one or more types of steam injection heating cycles, each of which may be particularly suitable for melting different types of cheese components 14. The steam injection heating cycles may be stored on a programmable microprocessor included in a control 184. For example, stored steam injection heating cycles could be customized for the type of cheese component 14 to be melted and/or the size or amount of cheese component 14, as well as the degree of melting that is to be achieved by controlling the number of injection heating cycles and/or the amount of steam produced in each cycle by controlling the amount of water input to flash steamer 114. Input panel 98 may also include a switch 178 that when activated by an operator initiates a steam injection heating cycle. Preferably, steam injection heating cycles are initiated by an operator depressing a remote switch 180 that is included at remote input panel 100. Electrical cable 182 connects control 184 to input panel 98, while electrical cable 188 connects control 184 to remote input panel 100 and remote switch 180. Electrical cable 190 connects control 184 with flash steamer 114 and its heating element 124 for heating bottom plate 122. Electrical cable 192 connects control 184 to liquid water injector 194. Power is supplied to control 184 by a cable 198 connected to electrical power line cord 104. A power on/off switch 200 may be located at control panel 98, and/or remote input panel 100, or at some other suitable location on steam unit housing 80.

FIG. 3 is a schematic illustration of the system of device 10. FIG. 3 illustrates that device 10 is supplied with water by connection to the water inlet line 110 to water inlet fitting 108 (shown only in FIG. 2). Water inlet line 110 is connected to a source of water, such as a water line for the Quick Service Restaurant where device 10 is to be used, or alternatively, a pressurized water tank (not shown) provided for device 10. A water pressure regulator 202 is provided inline along a water conduit 204 comprised of conduits 208 and 210 to maintain inlet water pressure for device 10 at a desired level for flash steamer 114. Typically, this will be in the range of about 20 psi to about 60 psi. Liquid water injector 194, such as a solenoid valve 212, is openable to allow water to flow from water conduit 208 through solenoid valve 212 into water conduit 210 and downstream for injection into flash steamer 114 through water inlets 142 (shown in FIG. 4).

As discussed previously, the injected liquid water is directed against a heated bottom plate 122 which comprises the bottom of heated cavity 134 of flash steamer device 114. The liquid water is injected for a steam injection heating cycle for melting cheese component 14. Preferably the water is injected in the form of a single pulse of injected liquid water that is rapidly converted into steam in heated cavity 134. Typically, substantially all of the injected quantity of water is converted into steam. The pulse of injected liquid water, or optionally pulses of injected liquid water, typically will be a predetermined amount of liquid water that forms a predetermined amount of steam. To accomplish liquid water injection, control 184 communicates with solenoid valve 212 through cable 192. Control 184 provides a signal to cause solenoid valve 212 to open for a relatively short period of time, and then cause solenoid valve 212 to return to its normally closed position after the pulse of liquid water has been injected. Control 184 includes a microprocessor controller having suitable software and electronically stored programmed data necessary for conducting a steam injection heating cycle for melting cheese component 14. This data may include information necessary to provide injected water pulses specifically for a plurality of different steam injection heating cycles for melting cheese. For example, the stored data may include information to control the length of time solenoid valve 212 is opened, the amount of injected liquid water and/or or the number of pulses injected that correspond to a particular steam injection heating cycle.

As described previously, the generated steam flows from heated cavity 134, through passageways 162 in diffuser plate 132 and into steam diffusing chamber 158. From the steam diffusing chamber, the steam travels downwardly through steam passageways 164, 166 in bottom plate 122 for injection as injected steam 156 into steaming chamber 12. Steaming chamber 12 has a top wall 214 that that is defined by a bottom surface 218 of bottom wall 120 of flash steamer 114, and a bottom surface 170 of bottom plate 122 of flash steamer 114. Steaming chamber 12 is also defined by a back wall 220 and sidewalls 222, 224. Steaming chamber 12 also has a bottom floor 228. In one embodiment of the invention, bottom floor 228 may be provided by work surface 22 upon which device 10 is placed, i.e. top surface 40 of work surface 22. In this instance the interior of support surface 28 is top surface 40 of work surface or counter 22. Advantageously, for the reasons described previously, this allows the bottom of container 32, comprised of bottoms 74 and 78, to remain in the same substantially horizontal plane while it is inserted into, and withdrawn from, steaming chamber 12 through entrance opening 84. Entrance opening 84 has a top border 230 defined by a bottom edge 233 of housing front side 82. The sides 234, 236 of entrance opening 84 are respectively defined by the inner sides of sides 90, 92 of steaming unit housing 80.

In now describing exemplary transport and packaging member shown as container 32 in greater detail, it is noted that compartment 34 includes a front wall 244, a back wall 246 and sidewalls 248, 250. Similarly, compartment 36 includes a front wall 254, a back wall 256 and sidewalls 258, 260. The front and back designations of walls 244, 246, 254 and 256 are in reference to a container 32 with compartment 34 as the front, or leading, compartment when container 32 is inserted into steaming chamber 12. When container 32 is in the open position, compartments 34, 36 have open tops 264, 266, respectively, as shown for example in FIGS. 1-4. The open position of container 32 allows the assembly of stacked food items 48, 50 in compartments 34, 36, respectively, and allows the container 32 to be inserted through entrance 84 of steaming chamber 12 for the melting of cheese component 14. Compartments 34, 36 are joined together at a joint 262. Joint 262 allows container 32 to be moved from the open position to the closed position (as indicated by arrow A in FIG. 5a) providing closed packaging 46 as illustrated in FIGS. 5a and 5b.

Steaming chamber 12 optionally includes a stop 268 for limiting the extent to which container 32 can be inserted into steaming chamber 12. Container 32 abuts against stop 268 to thereby prevent further insertion of container 32 into steaming chamber 12 by the operator. For example, when inserting container 32 with compartment 34 as the lead compartment and compartment 36 as the trailing compartment, front wall 244 of compartment 34 contacts a front edge 270 of stop 268. After front wall 244 of compartment 34 contacts stop 268, further insertion of container 32 into steaming chamber 12 is stopped. At this location, compartment 34 is properly positioned within steaming chamber 12 for steam injection heating through exit openings 172, 174 to melt cheese component 14 contained in compartment 34. At the same time compartment 36, and its contents, can be substantially isolated from the steam injection heating taking place for the cheese component 14 in compartment 34. This is because when front wall 244 of compartment 34 is against stop 268, trailing compartment 36 is spaced from steam exit openings 172, 174. Optionally, stop 268 can be located so that when insertion of container 32 is stopped by stop 268, open top 266 of compartment 36 is located at least substantially, if not wholly, outside of steaming chamber 12. As an alternative to optional stop 268, optionally back wall 220 of steaming chamber 12 can have the same effect as stop 268. For example, the depth of steaming chamber 12 between front entrance opening 84 and back wall 220 can be such that when front wall 244 of compartment 34 contacts back wall 220, container 32 is in the desired position. That position being relative to steam exit openings 172, 174, and/or entrance opening 84, as described herein. Stop 268 optionally can be configured to be adjustable, so that it can be moved closer or farther from entrance opening 84.

Stop 268 may also be located so that when the container 32 is fully inserted, back wall 246 of compartment 34 and/or front wall 254 of compartment 36 are at a position directly adjacent, or proximate to, entrance opening 84. In this position, back wall 246 and/or front wall 254 act as a baffle to hinder the escape of injected steam 156 out from entrance opening 84, and/or from entering trailing compartment 36 through open top 266. Limiting the escape of steam from entrance opening 84 can be further enhanced by limiting the height of entrance opening 84 so that clearance between container 32 and bottom edge 232 is relatively small. Preferably the height of entrance opening 84 exceeds the height of container 32 by less than about 20%, more preferably by less than about 10%. Likewise the width of entrance opening 84 may also be sized to accommodate the width of a maximum number of containers 32 which are desired or expected to be inserted side by side through entrance opening 84 at a time for simultaneously conducting steam injection heating. For the exemplary cheese melting device 10 illustrated in FIG. 1, two containers 32 simultaneously undergo steam injection heating. Accordingly, the width of entrance opening 84 will be sized so that there is relatively minimal horizontal clearance at entrance opening 84 for the two containers 32a, 32b inserted at entrance opening 84. Stated another way, the width of entrance opening 84 will exceed the combined widths of containers 32a and 32b at entrance opening 84 a relatively small amount, preferably by less than about 20%, and more preferably by less than about 10%.

In one preferred aspect of the invention the generated steam that is injected into steaming chamber 12 forms a cloud of steam that descends downward from top wall 214 of steaming chamber 12 to thereby melt cheese component 14. Preferably, the cloud of steam formed will dissipate before descending to the level of floor 228 of steaming chamber 12, or to the level of bottom 78 of compartment 34 of container 32. In this preferred aspect of the invention, the injected steam need not directly impinge cheese component 14 to melt the cheese component. Optionally, cheese component 14 is melted by device 10 by injecting steam in a manner where the injected steam does impinge the top surface of cheese component 14 that is melted in steaming chamber 12.

Figure 8:
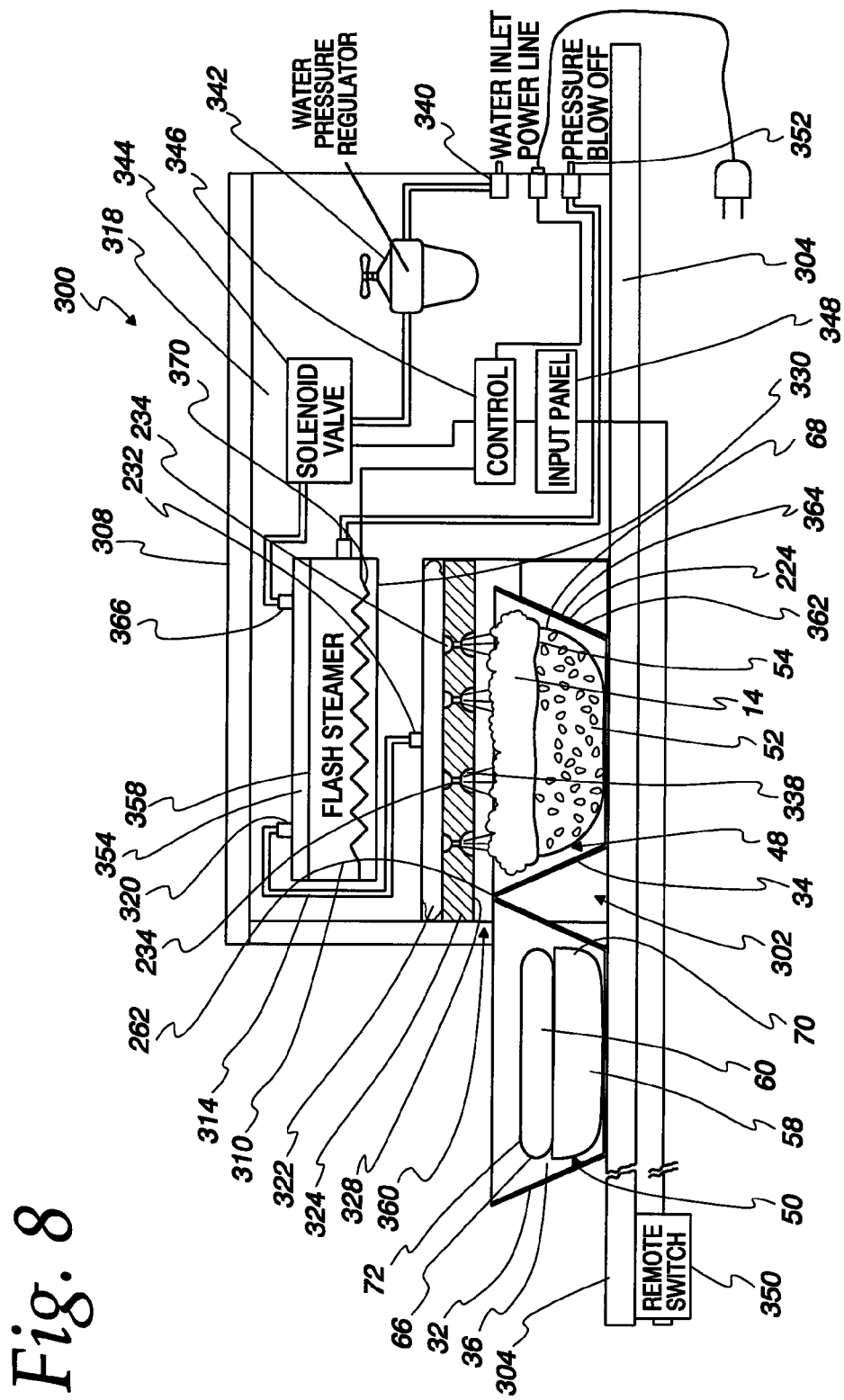
FIG. 8 is a side elevation view of a second embodiment of a device in accordance with the present invention.
Figure 9:
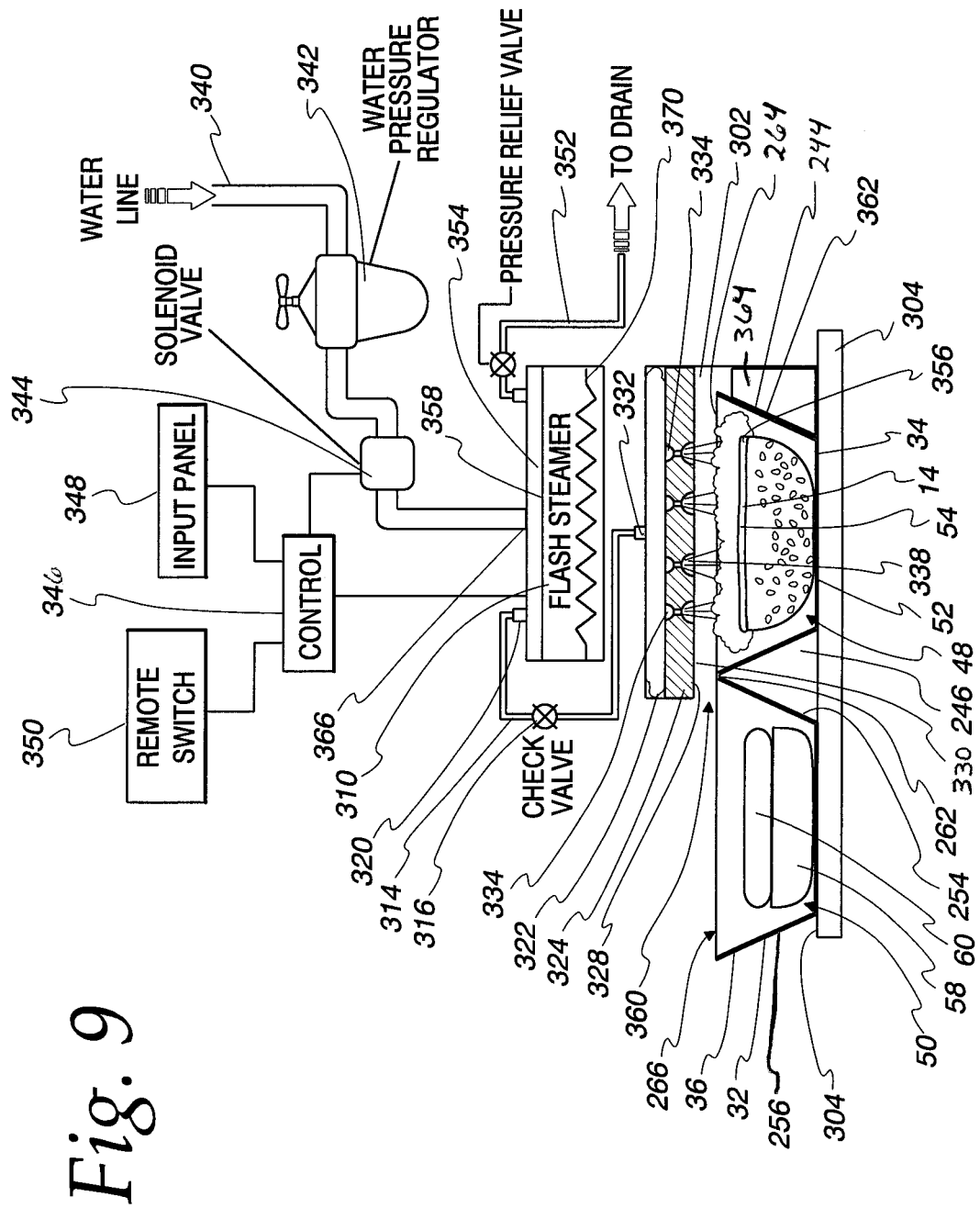
FIG. 9 is a schematic view of the device shown in FIG. 8.

Another embodiment of the present invention is illustrated as device 300 in FIGS. 8 and 9. Like device 10, device 300 is configured to rest on a counter or work surface. Thus, device 300 can also achieve the same superior operational benefits and efficiencies for the assembly, production and packaging of food product 18 having a melted cheese component 14. The primary difference between device 300 and device 10 is the manner in which steam is produced and delivered into steaming chamber 302 for steam injection heating to melt cheese component 14. It will be seen that most of the design and operation of device 300 is very similar to that previously described for device 10. Device 300 is positioned on a work surface 304, which like work surface 22 of device 10 can be a counter or work surface in a restaurant kitchen. Device 300 includes a housing 308 having a steam generator 310. Steam generator 310, like steam generator 114 of device 10, preferably is a flash steamer. A primary difference between device 10 and device 300 is that flash steamer 310 can be located more independently from the location of steaming chamber 302 of device 300. This is because the steam generated by flash steamer 310 is supplied to steaming chamber 302 through a steam supply conduit 314. Hence, flash steamer 310 can be located at substantially any position within the interior 318 of housing 308. Steam generator 310 can alternatively be located at a remote location outside of housing 308, such as for example, underneath work surface 304, or another remote location. Thus, device 300 potentially can be configured to provide an even lower profile than that provided by device 10. This could provide an advantage for use at a counter that has low lying shelves, cabinets, equipment or the like above the counter space at which device 300 is placed to rest.

Steam generated by flash steamer 310 exits at flash steamer outlet 320 and travels through steam supply conduit 314 toward steaming chamber 302. A check valve 316 may be included along conduit 314 to allow for only one-way steam flow in a direction toward steaming chamber 302. Device 300 typically includes a steam diffusing chamber 322. Steam diffusing chamber 322 is located at a position above a bottom plate 324. The bottom surface 328 of bottom plate 324 forms the top wall 330 of steaming chamber 302. Steam enters steam diffusing chamber 322 at inlet 332 and exits steam diffusing chamber 322 though one or more passageways 334 in bottom plate 324. The generated steam exits out passageways 334 through steam exit openings 338 for injection into steaming chamber 302. In the manner previously described for device 10, the injected steam is used to melt cheese component 14, more specifically, to melt exemplary cheese component 14 positioned on exemplary stacked food item 48 held in compartment 34 of container 32.

Exit openings 338 in bottom plate 324 may be arranged in substantially the same pattern and at substantially the same locations as steam exit openings 172, 174 of bottom plate 122 of device 10. Thus, when viewing the top wall 330 of steaming chamber 302 from the vantage point of steaming chamber 302, the pattern and location of exit openings 338 in top wall 330 would appear substantially the same as that for the steam exit openings 172, 174 of top wall 214 of steaming chamber 12 of device 10 as is illustrated in FIG. 6. It being understood however, the pattern of exit openings 338, like the pattern of exit openings 172, 174 can be of any other pattern that is suitable for accomplishing steam injection heating. It is also to be understood that alternatively, the pattern and locations of exit openings 338 may be arranged for targeted steam injection heating of a plurality of spaced apart target areas, as is discussed in detail below.

Device 300, like device 10, also includes a water inlet 340, a water pressure regulator 342, a liquid injector such as a solenoid valve 344, a control 346, a control panel 348, a remote control panel 350 and a pressure blow off 352, all of which function as described previously. Solenoid valve 344 causes the injection of liquid water into the steam generating chamber that is heated cavity 354, through water inlet 366. Heated cavity 354 has a heated surface 358. Liquid water is injected into heated cavity 354 against heated surface 358 and is rapidly converted into steam. An electric heating element 370 is provided to heat heated cavity 354. As described previously, the generated steam travels out from heated cavity 354 at outlet 320. The generated steam continues through conduit 314 and into steam diffusing chamber 322. The generated steam then exits diffusing chamber 322 through steam passageways 334. Thereafter generated steam exits exit openings 338 and into steaming chamber 302 as injected steam 356 for melting cheese component 14.

As in the operation of device 10, prior to the initiation of the steam heating cycle, container 32 is slid along work surface 304, through steaming chamber entrance opening 360, and into position within steaming chamber 302. As previously described, during the insertion of container 32, front wall 244 of compartment 34 of container 32 contacts the front surface 362 of a stop 364 to limit further insertion of container 32. At that position compartment 34 and cheese component 14 contained therein are in a position for receiving injected steam 356 to thereby melt cheese slice 54. At the same time, compartment 36 and the contents contained therein are spaced away from steam exit openings 338. Typically, compartment 36 is positioned at least substantially outside of steaming chamber 302 when steam is injected into steaming chamber 302. Thus, compartment 36 and food item 50 are thereby substantially isolated from the effects of the steam injection heating taking place in compartment 34. As with device 10, entrance opening 360 and steaming chamber 302 may be provided with a width for simultaneously accepting the front compartments 34 of two or more containers 32 for simultaneously steam injection heating to melt a cheese component 14 contained in each of compartments 34 for each of the two containers 32.

Figure 10:
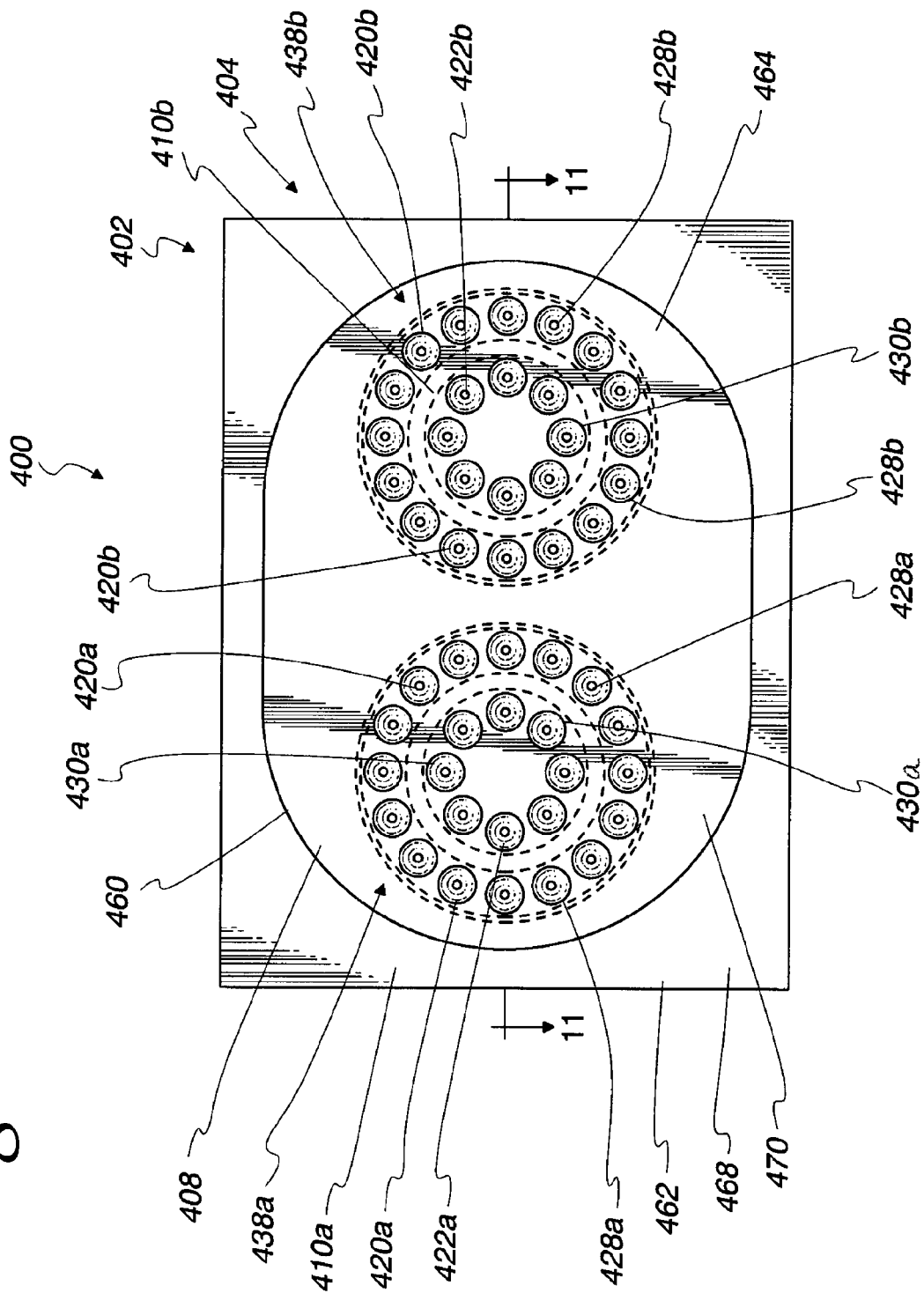
FIG. 10 is a bottom view of a third embodiment in accordance with the present invention showing the bottom wall and the bottom plate that forms the top wall of the steaming chamber of a modified device in accordance with the present invention.
Figure 11:
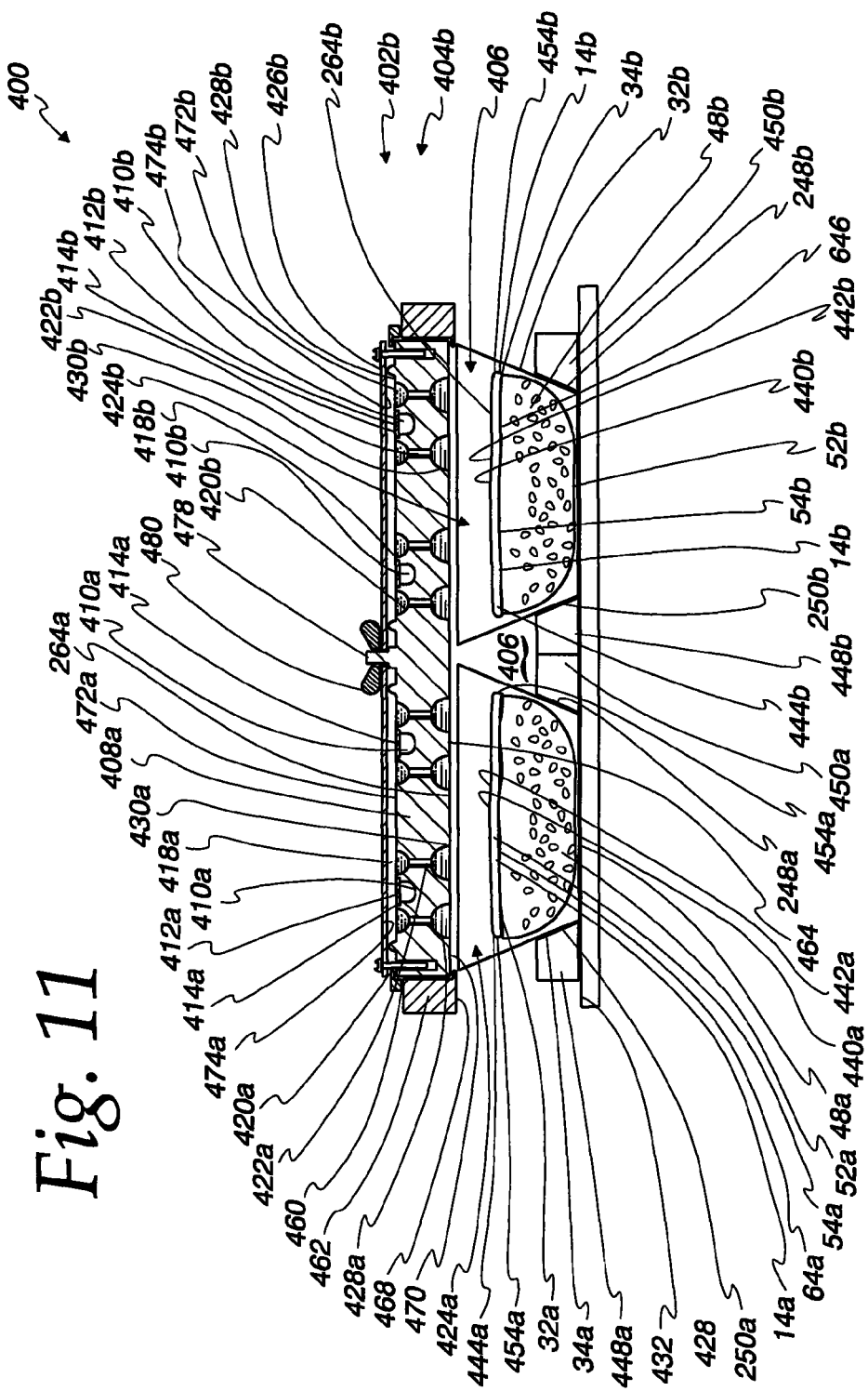
FIG. 11 is a side cross sectional view taken along line 11-11 of FIG. 10 and further showing therebelow for illustrative purposes two transport and packaging members positioned in the steaming chamber in accordance with the method of the present invention.

In another aspect of the present invention, the steam injected into the steaming chamber can be directed along a targeted pathway toward a precise target area. Moreover, targeted steam injecting of two separate and spaced apart target areas can be accomplished simultaneously, such as by exemplary device 400. In FIGS. 10, 11 there is illustrated a portion 402 of device 400. Portion 402 is a modification that can be incorporated into device 10 to allow targeted steam injection heating. Device 400 can be used to target the injection of steam to a target area that may be, for example, the top opening 264 of compartment 34 when container 32 has been fully inserted and positioned as previously described in the steaming chamber, such as steaming chamber 406 or 12 of device 400 or 10, respectively. In such case the targeted pathway of the injected steam is directed to enter compartment 34 through top opening 264. The targeted pathway of the injected steam is aimed, however, so that it does not directly travel to areas outside the outer border of top opening 264 of compartment 34, i.e. the border formed by inner sides of front wall 244, the inner sides of back wall 246 and the inner side of side sidewalls 248, 250 at the top of top opening 264. Thus, for this exemplary target area, the injected steam would only be directed so as to enter into the interior 252 of compartment 34 through top opening 264.

Alternatively, the targeted area may be a more limited area than the area of top opening 264. For example, the targeted area can be an area that is defined by a border that is spaced inwardly ¼ inch, or some other distance, from the outer border of top opening 264. Another alternative target area 440a may be the location of cheese component 14a on stacked food item 48a. More specifically, for example, the pathway of the injected steam is such that it is directed to target area 440a that is the top surface 442a of cheese slice 54a on food item 48a that is held in compartment 34a of container 32a that has been fully inserted into steaming chamber 406. With this exemplary target area 440a, the injected steam would be directed along a pathway that would intersect with the entire top surface area 442a of cheese slice 54a. However, the injected steam would not be directly aimed at any area outside the periphery 444a of the top surface area 442a of cheese slice 54a.

In one aspect of targeted steam injection, the injected steam impinges the target area 440a. For example, the steam is injected in a manner so that the injected steam actually contacts or impinges the top surface area 442a of cheese slice 54a before the injected steam is dissipated. In another aspect of targeted steam injection heating, the cloud of steam formed in steaming chamber 406 is also targeted at target area 440a. In this case, the cloud of steam is formed so that the downwardly descending cloud of steam passes through the target area before dissipating, or the cloud lands at and contacts the target area before dissipating. More specifically, in the case of a target area which comprises cheese slice 54a, the cloud of steam is formed so as to descend over target area 440a and/or to land onto target area 440a. Preferably, the cloud of steam does not, or at least does not substantially, land on or contact areas outside the outer border of target area 440a. When the target area 440a is an area such as the area of the top opening 264a of compartment 34a, the cloud of steam is targeted so as to descend through such target area 440a, but not descend outside, or substantially outside, the top borders of opening 264a of compartment 34a of container 32a.

Exemplary device 400 is similar in operation to device 10, except that modified portion 402 allows formation of injected steam that can be simultaneously directed at two spaced apart target areas, for example, target areas 440a and 440b. Device 400 has a flash steamer 404 of which only modified portion 402 is illustrated in FIGS. 10 and 11. Modified portion 402 replaces a corresponding lower portion 136 of flash steamer 114 of device 10. Lower portion 136 of device 10 is indicated generally in FIGS. 2 and 7. Modified portion 402 includes bottom plate 408 that replaces bottom plate 122 of device 10. Bottom plate 408 is mounted within an opening 460 of the bottom wall 462 of flash steamer 404. Such mounting is accomplished in a manner similar to that used to mount bottom plate 122 in opening 126 in bottom wall 120 of device 10. Also like device 10, a top wall 464 of steaming chamber 406 is defined by a bottom surface 468 of bottom wall 462 and a bottom surface 470 of bottom plate 408. Bottom plate 408 is configured to provide two separate heated cavities 410a and 410b for generating steam, rather than the single heated cavity 134 of device 10. Heated cavities 410a and 410b independently generate steam for steam injection heating of cheese component 14a and 14b contained in separate compartments 34a, 34b of separate containers 32a and 32b positioned in steaming chamber 406. Steaming chamber 406 may be the same, or substantially the same, as steaming chamber 12 of device 10. Similarly to the operation of device 10, liquid water is injected into heated cavities 410a and 410b to rapidly generate steam. The injected liquid water is supplied from solenoid valve 212 that causes liquid water to be injected through separate water inlet openings (not shown) for each of heated cavities 410a, 410b in a manner similarly described previously for water inlet openings 142 of device 10. Optionally, a separate solenoid valve 212 may be provided for independent liquid water injection for each of heated cavities 410a, 410b.

Referring first to heated cavity 410a, steam generated therein flows from heated cavity 410a, through a plurality of passageways 412a in a diffuser plate 414a, and into steam diffusing chamber 418a. Steam diffusing chamber 418a is defined by a top surface 472a of bottom plate 408 and a bottom surface 474a of a pressure plate 426. Pressure plate 426 is secured in place by an upstanding bolt 478 and a wing nut 480 as similarly described previously for pressure plate 140 of device 10. Steam travels downwardly from the steam diffusing chamber 418a through outer passageways 420a and inner passageways 422a in bottom plate 408. Steam is injected as injected steam 424a from steam exit openings 428a and 430a of steam passageways 420a and 422a, respectively. Injected steam 424a is directed to a predetermined target area 440a for melting cheese component 14a. Exemplary target area 440a may be cheese slice 54a on stacked food item 48a held in compartment 34a of container 32a, after container 32a has been fully inserted and positioned in steaming chamber 406, such as abutting against stop 268 as shown in FIG. 2. Container 32a typically will be supported on a counter or work surface 432 in a manner previously described. Steaming chamber 406 and work surface 432 may be substantially the same as steaming chamber 12 and work surface 22, respectively, as previously described above for device 10.

Similarly to the production of steam in heated cavity 410a, steam is generated in heated cavity 410b upon the injection of liquid water through one or more water inlet openings (not shown) for heated cavity 410b. Water inlets opening are similar to water inlets 142 for device 10 as shown in FIG. 4. The steam generated in heated cavity 410b flows from heated cavity 410b, through a plurality of passageways 412b in a diffuser plate 414b and into steam diffusing chamber 418b. Steam diffusing chamber 418b is defined by a top surface 472b of bottom plate 408 and a bottom surface 474b of pressure plate 426. From the steam diffusing chamber 418b, the steam travels downwardly through outer passageways 420b and inner passageways 422b in bottom plate 408 for injection as injected steam 424b. Steam injected out from steam exit openings 428b and 430b is directed to a target area 440b in order to melt cheese component 14b. Exemplary cheese component 14b is cheese slice 54b on stacked food item 48b held in compartment 34b of container 32b that has been fully inserted and positioned against stop 268 in steaming chamber 406 while supported on a work surface, such as work surface 432.

It is noted that to accomplish precise targeting of the injected steam toward target area 440a, outer steam exit openings 428a, and optionally also inner steam exit opening 430a, may be arranged in a pattern 438a that conforms to the shape of the intended target area 440a. Exemplary target area 440a is the entire circular top surface area 442a of cheese slice 54a extending to outer peripheral edge 444a of top surface area 442a. Accordingly, at least outer steam exit openings 428a can be arranged in a circular pattern 438a corresponding to the circular shape of target area 440a. Moreover, the outer circular openings 428a may be located so that steam injected therefrom will travel along a pathway so as to be directed at circular target area 440a, but not areas outside the circular outer border 454a of target area 440a. This may be accomplished by sizing the diameter of the pattern 438a of outer steam exit openings 428a so that only the target area 440a is directly injected with injected steam 424a. For example, the diameter of the pattern 438a of exit openings 428a may be arranged to be the same as or about the same as the diameter of the intended target area 440a. Additionally, and/or alternatively, the passageways 420a, and/or passageways 422a, may be angled from a vertical orientation in order to direct the pathway of injected steam to be within the outer border 454a of target area 440a, and/or done so to insure relatively complete coverage of the entire area of target area 440a. In a similar manner and for similar purposes, pattern 438b of outer steam exit openings 428b, and optionally the inner steam exit openings 430b may also be arranged in a circular pattern.

It is further noted that a square, rectangular, or other regular or irregular patterns for steam exit openings 428a and 430a, and/or 428b and 430b, alternatively may be used to correspond with various shaped target areas. The target areas may be varied relative to various shaped cheese products 14 to be melted by devices 10 or 300, and/or for use with various shaped compartments 34a and 34b that contain cheese component 14 to be melted. Precisely directing injected steam to a target area 440a, 440b, results in more efficient use of the generated steam, and hence more efficient melting of cheese component 14. Additionally, precisely directing steam injection to target area 440a, 440b avoids steam injection of the area outside of the target area. For example, it may be desired to melt cheese slice 54a that does not overlie the entire inner surface 64a of bun crown 52a. By limiting the target area 440a to only the area where cheese slice 54a is positioned, injected steam is not directly injected onto the portion of bun crown 52a that is not covered by cheese slice 54a. This avoids an undesired direct steam injection of the exposed surfaces of bun crown 52a, as well as the surfaces of any other food components, condiments and dressings. Hence bun crown 52a and the other food components will remain crisp and avoid sogginess. Moreover, by limiting direct steam injection to the target areas 440a, 440b, the potential that injected steam will unintentionally enter compartment 36a, 36b to steam bun heel 58 or any other contents of compartments 36a, 36b is also further reduced.

Control 184 of device 400 may be programmed to simultaneously inject steam to both of separate target areas 440a and 440b, or for selecting steam injection to only one of target areas 440a or 440b. Through the use of input panel 98, or remote input panel 100, an operator can be allowed to make a selection for injecting steam to only one of target areas 440a or 440b at a time, or to select simultaneously injecting steam to both targeted areas 440a, 440b. Targeted steam injection heat may also be incorporated in a device such as device 300 by arranging steam exit opening 338 in a pattern suitable to accomplished targeted steam injection heating to one or more target areas.

Optionally, it is noted that indicia 452 may be provided on the front of steam unit housing, such as shown on front side 82 of steam unit housing 80 as seen in FIG. 1. Indicia 452 allow an operator to more accurately position containers 32a and/or 32b when inserting them into steaming chamber 12 or 406. Alternatively, a guide such as rail guides 448a and 450a may be provided on work surface 432, or attached to the walls of steaming chambers 406, 12 or 302. Guides 448 and 450 provide accuracy in the positioning of containers 32a, 32b when sliding them into the entrance opening 84 of steaming chamber 12 or 406. Thus, when front wall 244 of compartment 34a is positioned against stop 268, and sidewalls 250a, 248a are respectively positioned against guides 448a, 450a, compartment 34a will be at a precise predetermined location. Thus, target area 440a is positioned in a location that is a substantially predetermined location. Likewise guides 448b and 450b may also be provided to precisely position compartment 34b of container 32b. Guides 448 and 450 may be provided to allow adjustment of their positioning to accommodate various sized and shaped containers 32.

While the invention has been described with respect to certain preferred embodiments, it is to be understood that the invention is capable of numerous changes, modifications and rearrangements without departing from the scope or spirit of the invention as defined in the claims.

What is claimed is:

1. A device suitable for melting an exposed cheese component of a food item in a container on a work surface, the container having an open position in which the container having an open container compartment for transporting the food item and the cheese component into the open container compartment, and a closed position in which the container provides a closed package for containing the food item with the melted cheese component for delivery therein to a consumer, the device comprising:
   a housing configured to rest directly on a counter,
   a cheese melting chamber within the housing and having an interior volume, a top wall, and an entrance opening extending to the work surface for allowing the container containing the food item and the cheese component to be readily inserted into and withdrawn from the cheese melting chamber by sliding the container along the work surface;
   a steam generator for generating steam from liquid water;
   one or more steam passageways providing fluid communication between the steam generator and the cheese melting chamber;
   a plurality of steam exit openings positioned above the interior volume for directing steam from the steam generator and into the interior volume; and
   a control for causing steam to be rapidly generated on demand by the steam generator by rapidly converting water supplied to the steam generator into steam, wherein the generated steam is directed through the one or more steam passageways and through the plurality of steam exit openings and into the cheese melting chamber for melting the cheese component contained in the container when in the steam chamber.

2. The device as claimed in claim 1 wherein the steam passageways pass through the top wall of the cheese melting chamber and the steam exit openings are positioned on a bottom surface of the top wall of the cheese melting chamber so that steam is injected downward from the exit openings and into the cheese melting chamber.

3. The device as claimed in claim 1 wherein the steam is injected downwardly into the cheese melting chamber to impinge on the cheese component positioned in the cheese melting chamber for melting of the cheese component.

4. The device as claimed in claim 2 wherein the steam exit openings are positioned to direct the injected steam toward two spaced apart target areas.

5. The device as claimed in claim 1 wherein the steam generator is a flash steamer.

6. The device as claimed in claim 5 wherein the control causes liquid water to be injected into the flash steamer and the flash steamer rapidly converts the liquid water into steam for injection into the cheese melting chamber.

7. The device as claimed in claim 6 wherein the flash steamer has a bottom and the bottom of the flash steamer is the top wall of the steaming chamber.

8. The device as claimed in claim 5 wherein the flash steamer is spaced from the top wall of the cheese melting chamber.

9. The device as claimed in claim 1 wherein the counter comprises the work surface, the counter being in a kitchen.

10. The device as claimed in claim 1 wherein the container is a clamshell container that when in the open position has a second compartment for holding a second food item, the first compartment having a bottom and the second compartment having a bottom, and when the container is inserted into the cheese melting chamber the bottom of the first compartment is supported on an interior support surface.

11. The device as claimed in claim 10 wherein when the container is in the open position, the first compartment has a first open top and the second compartment has a second open top, and the device includes structure to stop the insertion of a container into the steaming chamber at a position whereat the first open top is in the interior of the cheese melting chamber to allow steam injection heating of the cheese component while the second open top is substantially spaced outside the cheese melting chamber to substantially avoid steam injection heating of the second food item held in the second compartment.

12. The device of claim 1 wherein the steam generator produces pulses of steam.

13. The device as claimed in claim 1 wherein the steam generator is configured to produce sufficient steam that is directed into the cheese melting chamber to melt the cheese component comprising a hard slice of cheese in about 10 seconds or less.

14. A device for melting a cheese component of a food product comprising:
   a counter having a work surface;
   a steaming chamber positioned adjacent the work surface and having an entrance opening;
   an interior support surface in the steaming chamber provided by the counter for supporting a clamshell container when inserted into the steaming chamber through the entrance opening;
   a steam generator for generating steam from liquid water injected into the steam generator;
   at least one steam passageway for injecting the generated steam into the steaming chamber for melting the cheese component of the food product while contained in one compartment of a clamshell container that has been inserted into the steaming chamber;
   a plurality of steam injection exit openings positioned to direct the steam onto the cheese component; and
   a controller for causing steam to be injected through the at least one steam passageway, through the steam injected exit openings and into the steaming chamber, wherein the clamshell container can be supported on the work surface to allow the assembling of the food product in the clamshell container, and the work surface supporting the bottom of the clamshell container as it is inserted and withdrawn into and out of the steaming chamber, the interior support surface and the work surface supporting the bottom when the clamshell container is positioned in the steaming chamber for steam injection heating to melt the cheese component of the food item, and the work surface capable of supporting at least a portion of the bottom when closing the clamshell container to provide a closed clamshell container package for the delivery of the food product to a consumer.

15. The device as claimed in claim 14 wherein the clamshell container has two compartments in an open position, and in the open position, the bottom of the container comprises a first bottom for the first compartment and a second bottom for the second compartment in which the bottom of the first compartment is supported on the interior support surface and the second bottom is supported on the work surface when the clamshell container is positioned for steam injection heating to melt the cheese product.

16. The device as claimed in claim 14 further comprising an insertion limiting structure that limits the extent that the clamshell container can be inserted into the steaming chamber so that at least a portion of the clamshell container remains outside of the steaming chamber.

17. The device as claimed in claim 16 wherein the clamshell container is movable between an open position and a closed position, and in the open position the clamshell container providing the one compartment and an open second compartment, the insertion limiting structure is positioned so that when the fir-stone compartment of the open clamshell container is inserted into the steaming chamber to the full extent allowed by the insertion limiting structure, the one compartment is aligned within the steaming chamber for steam injection to melt the cheese component while the second compartment is positioned outside the steaming chamber.

18. A device suitable for melting an exposed cheese component of a food item in a container located on a work surface, the container having an open position in which the container has an open container compartment for transporting the food item and the cheese component, and a closed position for enclosing the food item with the melted cheese component for delivery therein to a consumer, the device comprising:

a housing having a side, a cheese melting chamber inside the housing, and a fixed opening through the side for access to the cheese melting chamber, the opening configured to allow the container containing the food item and the cheese component to slide into and out of the cheese melting chamber from the work surface; a steam generator for generating steam from liquid water;

one or more steam passageways providing fluid communication between the steam generator and the cheese melting chamber;

a plurality of steam exit opening positioned to direct the steam onto the cheese component; and a control for causing steam to be rapidly generated on demand by the steam generator, wherein the generated steam is directed through the one or more steam passageways and through the plurality of steam exit openings and into the cheese melting chamber to melt the cheese component contained in the container.

19. The device of claim 18 wherein the container is a clamshell container having a hinge connecting first and second halves, the container openable such that each half has a compartment.

20. The device of claim 19 wherein the device has a maximum insertion distance limiting the insertion of the container into the steaming chamber by sliding on the work surface such that when the container is inserted to the maximum insertion distance, the first half is in the cheese melting chamber and the second half is outside the device.

21. The device of claim 20 further comprising a stop in the steaming chamber, the stop setting the maximum insertion distance.

22. The device of claim 18 wherein the device is separate from the container.

23. The device of claim 18 wherein the housing is configured to rest directly on the work surface.

24. The device of claim 23 wherein the housing has an open bottom so that the container can be supported by the work surface in the steaming chamber.

25. The device of claim 18 wherein the opening extends to the work surface.

\* \* \* \* \*

UNITED STATES PATENT AND TRADEMARK OFFICE
CERTIFICATE OF CORRECTION

| | | |
|---|---|---|
| PATENT NO. | : 8,850,969 B2 | Page 1 of 1 |
| APPLICATION NO. | : 13/452182 | |
| DATED | : October 7, 2014 | |
| INVENTOR(S) | : Henry T. Ewald et al. | |

It is certified that error appears in the above-identified patent and that said Letters Patent is hereby corrected as shown below:

In The Claims

Claim 14, col. 20, line 57, delete "injected" and insert therefor --injection--.

Claim 18, col. 22, line 9, delete "opening" and insert therefor --openings--.

Signed and Sealed this
Thirtieth Day of December, 2014

Michelle K. Lee
*Deputy Director of the United States Patent and Trademark Office*